(12) United States Patent
Ladurini et al.

(10) Patent No.: US 11,514,799 B2
(45) Date of Patent: Nov. 29, 2022

(54) SYSTEMS AND METHODS FOR MANEUVERING AN AERIAL VEHICLE DURING ADVERSE WEATHER CONDITIONS

(71) Applicants: Aaron R. Ladurini, Palm Bay, FL (US); Nathan D. Plawecki, Melbourne, FL (US); Daniel W. Plawecki, Melbourne, FL (US)

(72) Inventors: Aaron R. Ladurini, Palm Bay, FL (US); Nathan D. Plawecki, Melbourne, FL (US); Daniel W. Plawecki, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 149 days.

(21) Appl. No.: 17/095,393

(22) Filed: Nov. 11, 2020

(65) Prior Publication Data

US 2022/0148442 A1 May 12, 2022

(51) Int. Cl.
*G08G 5/00* (2006.01)
*G06N 20/00* (2019.01)

(52) U.S. Cl.
CPC .......... *G08G 5/0039* (2013.01); *G06N 20/00* (2019.01); *G08G 5/006* (2013.01); *G08G 5/0069* (2013.01); *G08G 5/0091* (2013.01)

(58) Field of Classification Search
CPC .... G08G 5/0039; G08G 5/006; G08G 5/0069; G08G 5/0091; G06N 20/00
See application file for complete search history.

(56) References Cited

U.S. PATENT DOCUMENTS

| 1,779,855 A | 10/1930 | Roche |
| 2,399,217 A | 3/1942 | Fahmey |
| 2,385,392 A | 9/1945 | Van Dusen |

(Continued)

FOREIGN PATENT DOCUMENTS

WO 2006083361 A2 8/2006

OTHER PUBLICATIONS

International Search Report for corresponding PCT/US2021/052294, dated Jan. 31, 2022.

(Continued)

*Primary Examiner* — Shon G Foley
(74) *Attorney, Agent, or Firm* — Tarolli, Sundheim, Covell & Tummino LLP

(57) ABSTRACT

A machine learning maneuver model can be programmed to generate maneuver data identifying a plurality of flight paths for maneuvering an aerial vehicle through an adverse weather condition and a flight path confidence score for each flight path of the plurality of flight paths based on at least weather sensor data characterizing the adverse weather condition. The flight path confidence score can be indicative of a probability of successfully maneuvering the aerial vehicle through the adverse weather condition according to a respective flight path. A maneuver decision engine can be programmed to evaluate each flight path confidence score for each flight path relative to a flight path confidence threshold to identify a given flight path of the plurality of flight paths through the adverse weather condition that poses a least amount of structural risk to the aerial vehicle.

18 Claims, 9 Drawing Sheets

(56) References Cited

U.S. PATENT DOCUMENTS

| | | | |
|---|---|---|---|
| 2,612,327 | A | 9/1952 | Carlson |
| 2,843,337 | A | 7/1958 | Bennett |
| 3,113,747 | A | 12/1963 | Smith |
| 4,248,394 | A | 2/1981 | Klumpp |
| 4,267,987 | A | 5/1981 | McDonnell |
| 4,678,141 | A | 7/1987 | Sarrantonio |
| 4,757,959 | A | 7/1988 | Schroeder et al. |
| 4,824,047 | A | 4/1989 | Chadwick |
| 5,000,398 | A | 3/1991 | Rashev |
| 5,188,313 | A | 2/1993 | Piasecki |
| 6,691,949 | B2 | 2/2004 | Plump et al. |
| 7,137,126 | B1 | 11/2006 | Coffman et al. |
| 7,357,352 | B2 | 4/2008 | Speer et al. |
| 8,176,438 | B2 | 5/2012 | Zaman et al. |
| 8,740,134 | B2 | 6/2014 | Suzuki |
| 8,910,228 | B2 | 12/2014 | Agrawal et al. |
| 8,910,902 | B2 | 12/2014 | Speer |
| 8,950,698 | B1 | 2/2015 | Rossi |
| 9,022,322 | B2 | 5/2015 | Westbrook, Sr. |
| 9,171,473 | B1 | 10/2015 | McNally et al. |
| 9,188,700 | B2 | 11/2015 | Bunch et al. |
| 9,359,075 | B1 | 6/2016 | Von Flotow et al. |
| 10,255,818 | B2 | 4/2019 | Oldach |
| 10,831,192 | B1 * | 11/2020 | Piasecki ............... G05D 1/0077 |
| 11,215,467 | B1 * | 1/2022 | Neumann ............. G06N 20/00 |
| 2006/0121893 | A1 | 6/2006 | Tillotson et al. |
| 2009/0189802 | A1 | 7/2009 | Tillotson et al. |
| 2009/0284479 | A1 | 11/2009 | Dennis et al. |
| 2009/0294573 | A1 | 12/2009 | Wilson et al. |
| 2010/0193625 | A1 | 8/2010 | Sommer |
| 2011/0049288 | A1 | 3/2011 | Suzuki |
| 2011/0157178 | A1 | 6/2011 | Tuzel et al. |
| 2012/0068863 | A1 | 3/2012 | Tillotson |
| 2012/0091259 | A1 | 4/2012 | Morris et al. |
| 2012/0232721 | A1 | 9/2012 | Engblom |
| 2013/0037650 | A1 | 2/2013 | Heppe |
| 2013/0070108 | A1 | 3/2013 | Aerts et al. |
| 2013/0202071 | A1 | 8/2013 | Wei et al. |
| 2014/0130090 | A1 | 5/2014 | Krikorian |
| 2014/0130116 | A1 | 5/2014 | Krikorian |
| 2014/0158812 | A1 | 6/2014 | Luther |
| 2015/0021428 | A1 | 1/2015 | Rutan |
| 2015/0143459 | A1 | 5/2015 | Molnar et al. |
| 2015/0353197 | A1 | 12/2015 | Alber |
| 2016/0012643 | A1 | 1/2016 | Kezele et al. |
| 2016/0147308 | A1 | 5/2016 | Gelman et al. |
| 2016/0297520 | A1 | 10/2016 | Sada-Salinas et al. |
| 2018/0249144 | A1 | 8/2018 | Feng et al. |
| 2018/0364393 | A1 | 12/2018 | Platzer |
| 2019/0146092 | A1 | 5/2019 | Macdonald et al. |
| 2020/0286391 | A1 | 9/2020 | Beaurepaire et al. |

OTHER PUBLICATIONS

International Search Report for Application No. PCT/US2020/057728 dated Feb. 4, 2021.

Non Final Office Action for U.S. Appl. No. 16/736,559 dated Mar. 26, 2021.

* cited by examiner

SYSTEMS AND METHODS FOR MANEUVERING AN AERIAL VEHICLE DURING ADVERSE WEATHER CONDITIONS

TECHNICAL FIELD

The present disclosure relates to systems and methods for maneuvering an aerial vehicle during adverse weather conditions.

BACKGROUND

Weather is a temporary condition that occurs in an atmosphere that surrounds a celestial body, such as Earth. Weather is generally characterized by the following factors: temperature, atmospheric pressure, wind, humidity, precipitation, and cloudiness. Because these weather factors are always changing, each unique combination describes a different type of meteorological condition. Adverse weather conditions such as thunderstorms pose a risk to aerial vehicles during flight. In general, aerial vehicles are maneuvered (e.g., flown) around thunderstorms, as wind shears can cause structural damage to the aerial vehicle, and in some examples, destroying the aerial vehicle.

SUMMARY

The present disclosure relates to systems and methods for maneuvering an aerial vehicle during adverse weather conditions.

In an example, a system can include a machine learning maneuver (MLM) model and a maneuver decision engine that each can be executed on a processor on an aerial vehicle. The MLM model can be programmed to generate maneuver data that can identify a plurality of flight paths for maneuvering an aerial vehicle through an adverse weather condition and a flight path confidence score for each flight path of the plurality of flight paths based on at least weather sensor data that can characterize the adverse weather condition. The flight path confidence score for each flight path of the plurality of flight paths can be indicative of a probability of successfully maneuvering the aerial vehicle through the adverse weather condition according to a respective flight path. The maneuver decision engine can be programmed to evaluate each flight path confidence score for each flight path relative to a flight path confidence threshold to identify a given flight path of the plurality of flight paths through the adverse weather condition that poses a least amount of structural risk to the aerial vehicle.

In another example, a method can include providing at least weather sensor data that can characterize an adverse weather condition to an MLM model executing on a processor on an aerial vehicle to generate maneuver data that can identify a plurality of flight paths for maneuvering the aerial vehicle through an adverse weather condition and a flight path confidence score for each flight path of the plurality of flight paths. The flight path confidence score for each flight path of the plurality of flight paths can be indicative of a probability of successfully maneuvering the aerial vehicle through the adverse weather condition according to a respective flight path. The method can further include evaluating each flight path confidence score for each flight path relative to a flight path confidence threshold to identify at least two flight paths of the plurality of flight paths through the adverse weather condition, selecting a given flight path from the at least two flight paths through the adverse weather condition that poses a least amount of structural risk to the aerial vehicle and generating flight control data in response to selecting the given flight path. The flight control data can characterize flight control commands for the aerial vehicle for maneuvering the aerial vehicle along the given flight path through the adverse weather condition.

In a further example, a system can include memory to store machine readable instructions and data. The data can include weather sensor data that can be generated by one or more weather sensors on-board of an aerial vehicle that can characterize an adverse weather condition, and flight mission data that can characterize a level of importance of a mission being implemented by the aerial vehicle. The system can further include one or more processors that can access the memory and execute the machine readable instructions. The machine readable instructions can include an MLM model and a maneuver decision engine. The MLM model can be programmed to generate maneuver data that can identify a plurality of flight paths for maneuvering the aerial vehicle through the adverse weather condition and a flight path confidence score for each flight path of the plurality of flight paths based on the weather sensor data and the flight mission data. The maneuver decision engine programmed can be programmed to evaluate each flight path confidence score for each flight path relative to a flight path confidence threshold to identify a given flight path of the plurality of flight paths through the adverse weather condition that can pose a least amount of structural risk to the aerial vehicle. The maneuver decision engine can be programmed to generate flight control data in response to identifying the given flight path. The flight control data can characterize flight control commands for the aerial vehicle for maneuvering the aerial vehicle with respect to the given flight path through the adverse weather condition. The flight control data can be employed to cause the aerial vehicle to maneuver according to the given flight path through the adverse weather condition. The maneuver decision engine can be programmed to generate MLM tuning data that can be indicative of whether the given flight path is one a safe flight route or an unsafe flight route in response to maneuvering the aerial vehicle according to the given flight path through the adverse weather condition. The maneuver decision engine can be programmed to update the MLM model based on the MLM tuning data, such that the given flight path is one emphasized in response to determining that the given flight path is the safe flight route or deemphasized in response to determining that the given flight path is the unsafe flight route, for a subsequent adverse weather condition.

DETAILED DESCRIPTION

Figure 1:
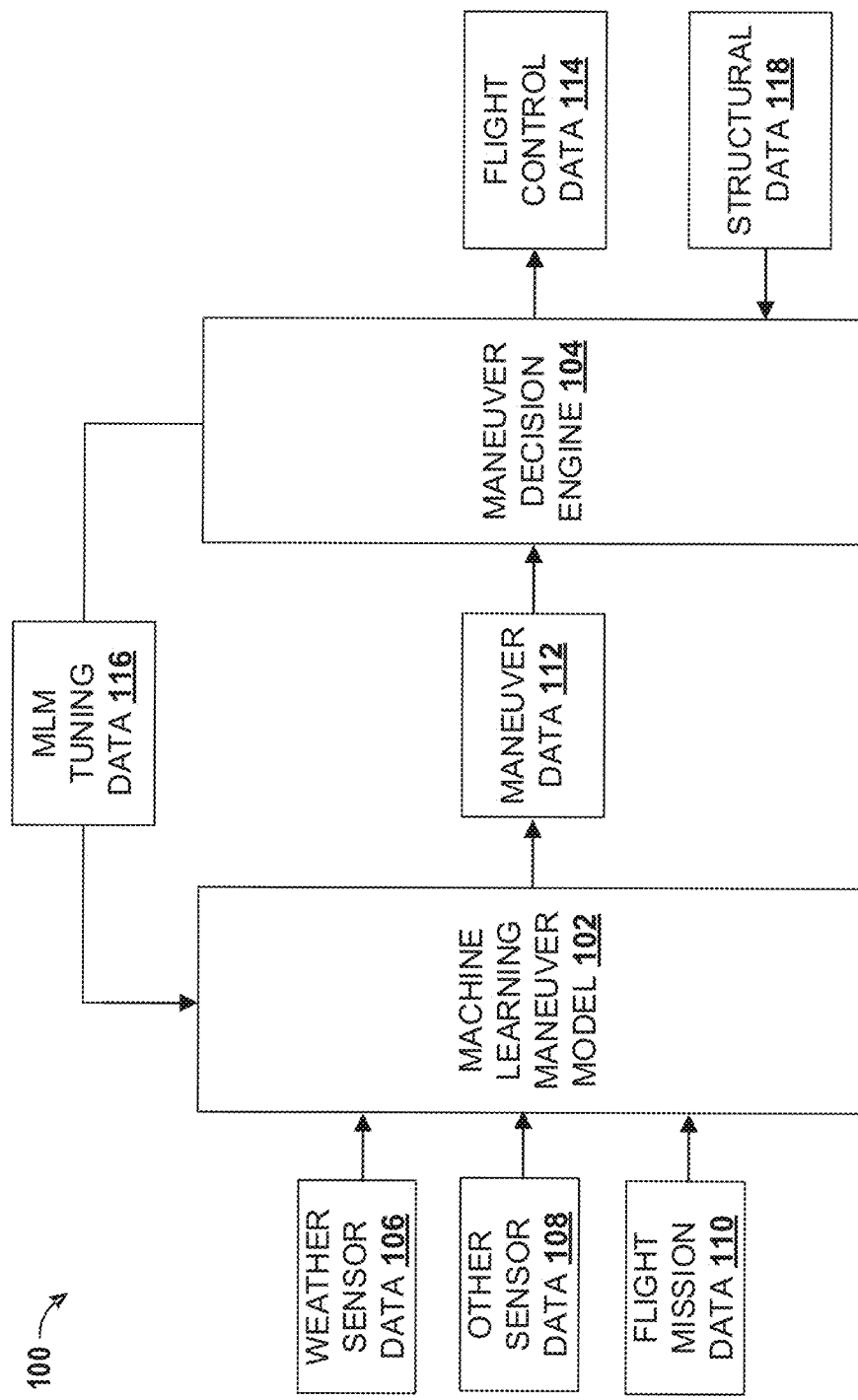
FIG. 1 illustrates an example of an adverse weather flight (AWF) control system for determining a flight path for an aerial vehicle through an adverse weather condition.

The present disclosure relates to systems and methods for maneuvering an aerial vehicle during adverse weather conditions. Adverse weather conditions are weather events that occur in an atmosphere of a celestial body (e.g., Earth). Example weather events can include a storm, such as a thunderstorm, a snowstorm, a rainstorm, an ice storm, a hurricane, a tropical cyclone, a windstorm, a dust storm, a blizzard, and a sandstorm. During adverse weather conditions, aerial vehicles, such as unmanned aerial vehicles (UAVs) are configured to maneuver (e.g., fly) around adverse weather conditions to minimize or reduce a likelihood of being damaged or destroyed. Aerial vehicles that are pilot operated can be maneuvered to safely guide the aerial vehicle through the adverse weather condition with minimal structural risk to the aerial vehicle. However, if the pilot lacks experience, the pilot may be instructed or decide to maneuver around the adverse weather condition to avoid putting the aerial vehicle at risk.

In some examples, aerial vehicles, such as UAVs, can be guided (e.g., maneuvered) through the weather event if the UAV can maintain communication with an operator to receive appropriate flight commands. However, in some situations, the operator may lose communication (e.g., radio communication) with the UAV, such as in close proximity to the adverse weather condition or while maneuvering the UAV through the adverse weather condition. If the UAV loses communication with the operator, for example, while being maneuvered through the adverse weather condition, can increase the likelihood that the aerial vehicle suffers structural damage as the UAV cannot be maneuvered to avoid dangerous portions of the adverse weather condition. In some examples, UAVs are configured to go around the adverse weather condition in response to losing communication with the operator. Because the aerial vehicle is configured to avoid adverse weather scenarios, the aerial vehicle may be required to avoid dangerous weather events and deviate from a respective flight path. However, such flight actions may undermine a mission of the aerial vehicle or cause the aerial vehicle to use up fuel reserves that may not permit the aerial vehicle to safely return to base or complete the mission.

Systems and methods are described herein for maneuvering an aerial vehicle through an adverse weather event. In some examples, an aerial vehicle can be configured with an AWF control system that includes an MLM model and a maneuver decision engine that respectively can be configured to execute on a processor of the aerial vehicle. In some examples, the MLM model can be configured to execute on a respective processor of the aerial vehicle and the maneuver decision engine can be configured to execute on another processor of the aerial vehicle. In other examples, the AWF can be implemented on a single processor of the aerial vehicle. In additional examples, the AWF control system can be employed as part of a flight control system of the aerial vehicle.

The MLM model can be programmed to generate maneuver data that can identify a plurality of flight paths for maneuvering the aerial vehicle with respect to the adverse weather condition and a flight path confidence score for each flight path of the plurality of flight paths based on at least weather sensor data generated by one or more weather sensors and/or systems of the aerial vehicle characterizing the adverse weather condition. In further examples, the MLM model can be programmed to generate the maneuver data based on flight mission data characterizing a level of importance of a mission being implemented by the aerial vehicle and/or other sensor data generated by one or more non-weather sensors of the aerial vehicle.

The maneuver decision engine can be programmed to evaluate each flight path confidence score relative to a flight path confidence threshold to identify or select a given flight path of the plurality of flight paths through the adverse weather condition. The flight path confidence threshold can correspond to a level of risk that has been selected or determined as acceptable for the aerial vehicle. The flight path confidence threshold can be user-defined. In some examples, the maneuver decision engine can be programmed to select the flight path confidence threshold from a list of flight path confidence thresholds based on the importance of the mission being implemented by the aerial vehicle. For example, if the aerial vehicle is implementing a critical mission, the flight path confidence threshold can be selected from the list of flight path confidence thresholds that can influence a structural risk to the aerial vehicle corresponding to a likelihood of the aerial vehicle suffering structural damage (e.g., from lighting, hail, and the like) while being maneuvered through the adverse weather condition. Thus, in some examples, such as critical missions, the selected flight path through the adverse weather condition can pose an increased level of structural risk to the aerial vehicle, however, permit the aerial vehicle to complete the mission within defined mission parameters (e.g., within a predetermined amount of time). The maneuver decision engine can be programmed to generate flight control data in response to identifying or selecting the given flight path for the aerial vehicle through the adverse weather condition. The maneuver decision engine can be programmed to cause the aerial vehicle to maneuver according to the given flight path through the adverse weather condition based on the flight control data.

In some examples, the aerial vehicle can be a manned aerial vehicle that is being operated by at least one pilot. The maneuver decision engine can be programmed to include a flight path graphical user interface (GUI) generator. The flight path GUI generator can be programmed to display on a user interface (e.g., a display) a radar graphical image characterizing the adverse weather condition. The flight path GUI generator can be programmed to overlay each flight path of the plurality of flight paths over the radar graphical image to alert the at least one pilot of possible flight routes with respect to the adverse weather condition. At least one pilot can evaluate each possible flight path to identify the given flight path with respect to the adverse weather condition. Accordingly, by implementing the systems and methods described herein aerial vehicles can be configured to discover flight paths through adverse atmospheric conditions having an acceptable level of structural risk to the aerial vehicle.

In some examples, the systems and methods described herein can be used in industrial applications (e.g., autonomous industrial robots), autonomous submersibles (e.g., to avoid marine threats), and autonomous wheelchairs. While examples are presented herein with respect to weather conditions, such as thunderstorms, the systems and methods described herein can be used in smoke related conditions, such as resulting from wildfires (e.g., brush fire, bush fire, desert fire, forest fire, grass fire, hill fire, peat fire, prairie fire, or vegetation fire). In some examples, the systems and methods described herein can be used in ground vehicle applications to maneuver a ground vehicle with respect to adverse road conditions, such as an accident, an animal, a pothole, and the like.

FIG. 1 illustrates an example of an AWF control system 100 for determining a flight path for an aerial vehicle through an adverse weather condition. The AWF control system 100 can be implemented on a computer system of the aerial vehicle, such as a flight control system. The flight control system can include one or more processors and memory storing machine readable instructions for implementing functions of an AWF control system 100, as described herein. Each processor can include a single and/or a multicore processing unit. The processor can be configured to retrieve and execute the machine readable instructions to determine one or more flight paths with respect to the adverse weather condition, and in some examples, control one or more flight maneuvers or actions of the aerial vehicle, and thus flight of the aerial vehicle with respect to a corresponding flight path.

The AWF control system 100 can include an MLM model 102. The MLM model 102 can be generated by an MLM algorithm (not shown in FIG. 1). The MLM algorithm can be programmed based on learned weather maneuver data to generate the MLM model 102. The learned weather maneuver data can be stored in memory and can characterize a plurality of past adverse weather conditions and associated maneuvers implemented by one or more aerial vehicles with respect to the plurality of past adverse weather conditions. In some examples, during a flight of the aerial vehicle, the MLM model 102 can be continuously updated by a maneuver decision engine 104 of the AWF control system 100 to improve the MLM model flight path recommendations, as described herein based on the learned weather maneuver data. In some examples, learned experiences by the one or more other vehicles can be shared with the vehicle as part of the weather maneuver data. The learned experiences can characterize one or more maneuvers implemented by the one or more vehicles with respect adverse weather conditions.

The maneuver decision engine 104 can be programmed to provide feedback data indicative of whether a given flight path is one a safe flight route or an unsafe flight route through the adverse weather condition in response to the aerial vehicle being maneuvered with respect to the given flight path through adverse weather condition. Thus, the MLM model 102 can be tuned (e.g., updated) for future adverse weather conditions based on the feedback data, such that the given flight path is one emphasized and deemphasized as a recommended flight path in future adverse weather scenarios.

In some examples, the aerial vehicle includes one or more sensors and can store sensor data from the one or more sensors at a storage location of the aerial vehicle that can be accessed by the MLM model 102. During the flight of the aerial vehicle, the MLM model 102 can be programmed to receive or retrieve weather sensor data 106 generated by one or more weather sensors of the aerial vehicle. In some examples, the aerial vehicle can come in proximity and/or in range of an adverse weather condition (e.g., a thunderstorm). The weather sensor data 106 can characterize the adverse weather condition. For example, if the adverse weather condition is a storm, the weather sensor data 106 can characterize one or more characteristics of the thunderstorm. Thus, in some examples, the weather sensor data 106 can characterize precipitation, convective cell activity, and intensity of the precipitation of the thunderstorm.

In some examples, the MLM model 102 can be programmed to receive or retrieve other sensor data 108 generated by one or more non-weather sensors of the aerial vehicle. The one or more non-weather sensors can include at least one camera and the other sensor data 108 can include one or more camera images of the adverse weather condition. In some examples, the one or more sensors can include an airspeed sensor and/or an altitude sensor, and thus the other sensor data 108 can characterize the airspeed and the altitude of the aerial vehicle. In further examples, the MLM model 102 can be programmed to receive or retrieve flight mission data 110 characterizing a current mission objective of the aerial vehicle. In some examples, the flight mission data 110 can characterize a level of importance of a mission being implemented by the aerial vehicle. In some examples, the other sensor data 108 can be indicative or include turbulence information and other flight hazards.

The MLM model 102 can be programmed to process the weather sensor data 106, the other sensor data 108, and/or the flight mission data 110 to identify or determine a plurality of flight paths for maneuvering the aerial vehicle through the adverse weather condition and a flight path confidence score for each flight path of the plurality of flight paths. The flight path confidence score for each flight path of the plurality of flight paths can be indicative of a probability of successfully maneuvering the aerial vehicle through the adverse weather condition according to a respective flight path. A successful maneuver of the aerial vehicle through the adverse weather condition can correspond to a level of structural damage that the aerial vehicle can experience that has been determined as acceptable for the aerial vehicle.

The MLM model 102 can be programmed to generate maneuver data 112 characterizing each flight path of the plurality of flight paths and respective flight path confidence scores. Thus, the maneuver data 112 can characterize flight instructions and/or commands for the aerial vehicle to implement to maneuver the aerial vehicle through the adverse weather condition. Thus, in some examples, each flight path characterized by the maneuver data 112 can refer to a set of flight instructions and/or commands for the vehicle to implement, such that the aerial vehicle can be maneuvered through the adverse weather condition. The MLM model 102 can be programmed to communicate the maneuver data 112 to the maneuver decision engine 104. The maneuver decision engine 104 can be programmed to evaluate each flight path confidence score for each flight path relative to a flight path confidence threshold to identify the given flight path of the plurality of flight paths through the adverse weather condition. The flight path confidence threshold can correspond to a level of risk that has been selected or determined as acceptable for the aerial vehicle. The flight path confidence threshold can be user-defined.

In some examples, the maneuver decision engine 104 can be programmed to select the flight path confidence threshold from a list of flight path confidence thresholds based on the importance of the mission being implemented by the aerial vehicle. For example, if the aerial vehicle is implementing a critical mission, the flight path confidence threshold can be selected from the list of flight path confidence thresholds that can influence a structural risk to the aerial vehicle corresponding to a likelihood of the aerial vehicle suffering structural damage (e.g., from lighting, hail, and the like) while being maneuvered through the adverse weather condition. The term "structural risk" as used herein in relating to an aerial vehicle can refer to any damage on an airframe that can lead to loss of the aerial vehicle and/or damage to a mission payload. In some examples, damage to the mission payload can lead to mission failure or loss. In some instances, such as critical missions, the selected flight path by the maneuver decision engine 104 through the adverse weather condition can pose an increased level of structural risk to the aerial vehicle, however, permit the aerial vehicle to complete the mission within defined mission parameters (e.g., within a predetermined amount of time). Accordingly, the given flight path can correspond to a flight route through the adverse weather condition according to which the aerial vehicle can be maneuvered that can have a risk level that is acceptable corresponding to an acceptable amount of structural damage that the aerial vehicle can experience from the adverse weather condition.

By way of further example, the maneuver decision engine 104 can be programmed to compare each flight path confidence score to the flight path confidence threshold to identify one or more flight paths of the plurality of flight paths that can be most closest to the flight path confidence threshold or greater than or equal to the flight path confidence threshold. In further examples, the maneuver decision engine 104 can be programmed to evaluate each flight path confidence score for each flight path relative to the flight path confidence threshold to identify at least two flight paths of the plurality of flight paths through the adverse weather condition that can be greater than the flight path confidence threshold. The maneuver decision engine 104 can be programmed to evaluate the flight mission data 110 indicative of the level of importance of the mission being implemented by the aerial vehicle relative to a mission importance threshold.

The maneuver decision engine 104 can be programmed to select the given flight path from the at least two flight paths through the adverse weather condition based on the evaluation of the flight mission data 110 relative to the mission importance threshold. By way of example, if the level of importance of the mission is indicated as critical by the flight mission data 110, the maneuver decision engine 104 can be programmed to select the given flight path from the at least two flight paths through the adverse weather condition that has a lowest flight path confidence score. In some examples, the given flight path from the at least two flight paths with the lowest flight path confidence score can have minimal impact on the mission (e.g., minimal to no increase in time needed to complete the mission).

In some examples, maneuver control data can be provided to the aerial vehicle before implementing the mission. The aerial vehicle can be configured to operate according to the maneuver control data that can include a plurality of maneuver rules that can restrict maneuvers of the aerial vehicle. The maneuver control data can include an airspace boundary rule indicative of an airspace boundary (e.g., vertical and/or horizontal boundary) that the aerial vehicle may not be permitted to cross. In other examples, the maneuver control data can include a weather restriction rule that can restrict maneuvering of the aerial vehicle through the adverse weather condition. The maneuver decision engine 104 can be programmed override the maneuver control data, such as the weather restriction rule, in response to identifying the given flight path and thus permit the aerial vehicle to be maneuvered through the adverse weather condition.

By implementing the AWF control system 100 as described herein on-board of the aerial vehicle allows identifying a flight path through the adverse weather condition that poses an acceptable level of risk to the aerial vehicle. Accordingly, the AWF control system 100 can be programmed to override the maneuver control data according to which the aerial vehicle was initially configured to operate (e.g., at an on-set of the mission) in response to identifying a respective flight path through the adverse weather condition with an acceptable amount of structural to the aerial vehicle. Therefore, the AWF control system 100 can be programmed to determine or identify a penetration path through dangerous localized weather.

In some examples, the maneuver decision engine 104 can be programmed to output or generate flight control data 114 in response to identifying the given flight path. The flight control data 114 can characterize flight control commands for the aerial vehicle for maneuvering the aerial vehicle according to the given flight path through the adverse weather condition. The flight control data 114 can be employed to cause the aerial vehicle to maneuver according to the given flight path through the adverse weather condition.

In some examples, the maneuver decision engine 104 can be programmed to generate MLM tuning data 116 to improve future flight path recommendations of the MLM Model 102, and thus tune the MLM model 102 to improve a quality of flight path recommendations being provided by the MLM model 102 in future adverse weather scenarios. The maneuver decision engine 104 can be programmed to generate MLM tuning data 116 that can be indicative of whether the given flight path is one the safe flight route or the unsafe flight route in response to maneuvering the aerial vehicle according to the given flight path through adverse weather condition.

For example, in response to successfully maneuvering the aerial vehicle according to the given flight path through the adverse weather condition, the maneuver decision engine 104 can be programmed to generate the MLM tuning data 116. The given flight path can be flagged or identified by the maneuver decision engine 104 as the safe flight route in response to the maneuver decision engine 104 determining that a structural state of the aerial vehicle after being maneuvered through the adverse weather condition is less than a structural integrity threshold. In some examples, the given flight path can be flagged or identified as the unsafe flight route in response to the maneuver decision engine 104 determining that the structural state of the aerial vehicle after being maneuvered through the adverse weather condition is greater than the structural integrity threshold.

In some examples, the MLM tuning data 116 can indicate that the aerial vehicle was successfully maneuvered according to the given flight path through the adverse weather condition. For example, if a structural state of the aerial vehicle after being maneuvered according to the given flight path through the adverse weather condition is less than or equal to a given amount of damage that has been determined as acceptable for the aerial vehicle, the given flight path can be flagged or identified as the safe flight route. By way of further example, if the aerial vehicle suffered 10% or less structural damage by being maneuvered through the adverse weather condition according to the given flight path, the given flight path can be flagged or identified as the safe flight route.

In additional or alternative examples, the given flight path can be flagged or identified as the safe flight route based on turbulence or wind data. The turbulence and/or the wind data can be provided by another system or device on-board the aerial vehicle employed to monitor (e.g., detect, measure, and the like). The turbulence data can characterize a turbulence intensity (e.g., light, moderate, severe, or extreme) experienced by the aerial vehicle as being maneuvered through the adverse weather condition according to the given flight path. In some examples, the turbulence experienced by the aerial vehicle can be quantified as an Eddy Dissipation Rate (EDR). The wind data can characterize a wind speed of one or more winds experienced by the aerial vehicle as being maneuvered through the adverse weather condition according to the given flight path.

By way of example, the maneuver decision engine 104 can be programmed to evaluate the turbulence and/or the wind experienced by the aerial vehicle to determine whether the given flight path is to be flagged or identified as the safe flight route. The maneuver decision engine 104 can be programmed to compare the turbulence and/or wind data to an air condition threshold to determine whether the given flight path is to be flagged or identified as the safe flight route. For example, the maneuver decision engine 104 can be programmed to compare the turbulence intensity and/or the wind speed to a corresponding threshold, such as a turbulence threshold and/or a wind threshold, to determine whether the given flight path is to be flagged or identified as the safe flight route. The maneuver decision engine 104 can be programmed to generate the MLM tuning data 116 based on the comparison to indicate whether the given flight path is safe.

In some examples, the aerial vehicle can include one or more structural sensors (e.g., a strain gauge, a comparative vacuum monitoring sensor, and the like) that can be employed to monitor a structural integrity of the aerial vehicle (e.g., monitor the aerial vehicle for structural defects, damage, cracks, and the like). The one or more structural sensors can be configured to provide structural data 118 characterizing the structural integrity of the aerial vehicle. The structural data 118 can characterize the structural integrity of the aerial vehicle, such as after maneuvering the aerial vehicle according to the given flight path through the adverse weather condition. The maneuver decision engine 104 can be programmed to evaluate the structural data 118 relative to the structural integrity threshold to determine whether the given flight path is to be flagged or identified as the safe flight route through the adverse weather condition. For example, if the structural data 118 is greater than the structural integrity threshold, the maneuver decision engine 104 can flag or identify the given flight path as the unsafe flight route as part of the MLM tuning data 116. In other examples, if the structural data 118 is less than the structural integrity threshold, the maneuver decision engine 104 can flag or identify the given flight path as the safe flight route as part of the MLM tuning data 116.

In other examples, if the structural state of the aerial vehicle after being maneuvered according to the given flight path through the adverse weather condition is less than the given amount of damage that has been deemed acceptable by the user, the given flight path through the adverse weather condition can be identified or flagged as the unsafe flight path. For example, if the aerial vehicle suffered 25% structural damage by being maneuvered according to the given flight path through the adverse weather condition, the given flight path can be identified or flagged by the maneuver decision engine 104 as the unsafe flight route.

In some examples, the maneuver decision engine 104 can be programmed to cause the MLM model 102 to be updated based on the MLM tuning data 116, such that the given flight path is one emphasized in response to determining that the given flight path is the safe flight route or deemphasized in response to determining that the given flight path is the unsafe flight route, for a subsequent adverse weather condition. In some examples, the MLM model 102 can be programmed to generate updated maneuver data based on updated weather sensor data characterizing the subsequent adverse weather condition. The updated maneuver data can identify a plurality of new flight paths through the subsequent adverse weather condition and a corresponding path confidence score for each new flight path. One of the plurality of new flight paths can correspond to the given flight path and can have a respective flight path confidence score that can be greater than the flight path confidence score for the given flight path through the adverse weather condition.

By way of further example, if the MLM tuning data 116 indicates that the given flight path through the adverse weather condition is the safe flight route, the MLM model 102 can be programmed to emphasize the given flight path by increasing the flight path confidence score for the given flight path in future adverse weather conditions. In some examples, if the MLM tuning data 116 indicates that the given flight path through the adverse weather condition is the unsafe safe flight route, the MLM model 102 can be programmed to deemphasize the given flight path by decreasing the flight path confidence score for the given flight path in future adverse weather conditions. Accordingly, the MLM model 102 can be tuned following each maneuver of the aerial vehicle to improve the quality of flight path recommendations being provided by the MLM model 102 with respect to adverse weather conditions.

In some examples, the aerial vehicle can be in communication with a base station (e.g., a ground control center). As the aerial vehicle approaches the adverse weather condition, the aerial vehicle can lose communication with the base station. The AWF control system 100 can be programmed to identify the given path as described herein and navigate the aerial vehicle according to the given flight path through the adverse weather condition in response to losing communication with the base station. In response to successfully maneuvering the aerial vehicle according to the given flight path through the adverse weather condition and reestablishing communication with the base station, the maneuver decision engine 104 can be programmed to provide the MLM tuning data 116 that can indicate that the given flight path is the safe flight route. Accordingly, the aerial vehicle can be maneuvered with respect to adverse weather conditions in response to losing communication with the base station. In some examples, the aerial vehicle is maneuvered during radio silent missions and scenarios in which the aerial vehicle is implemented as an autonomous aerial vehicle in which no human input is provided for guiding the aerial vehicle with respect to adverse weather conditions.

Figure 2:
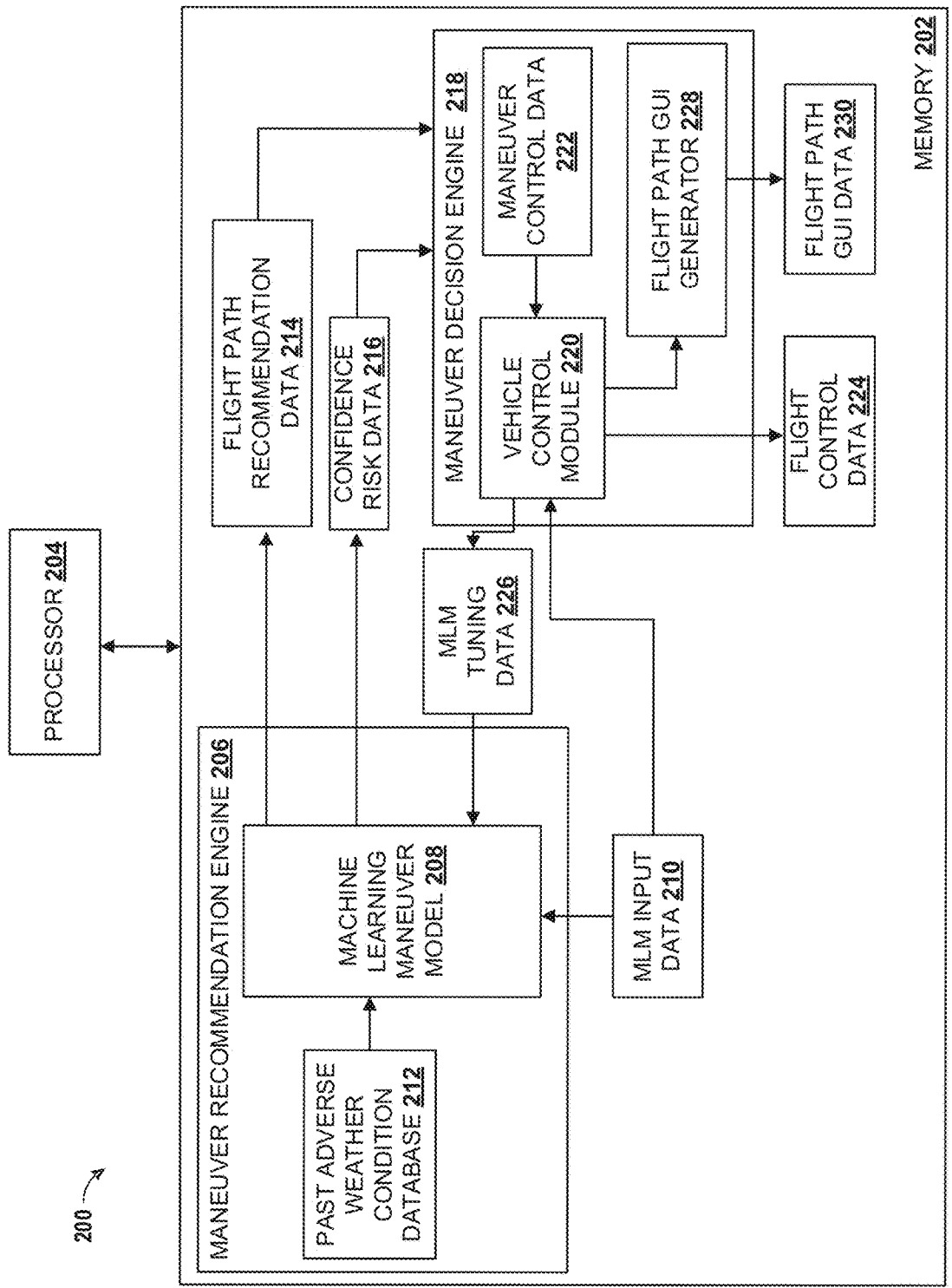
FIG. 2 illustrates an example of a computing platform for implementing an AWF control system for determining a flight path for an aerial vehicle through an adverse weather condition.

FIG. 2 illustrates an example of a computing platform 200 for implementing an AWF control system for determining a flight path for an aerial vehicle through an adverse weather condition. The computing platform 200 includes one or more processors 202 and memory 204. The one or more processors 202 can access the memory 204 and execute the machine readable instructions stored therein to implement one or more functions as described herein. The memory 204 can be implemented as volatile memory (e.g., random access memory) and/or non-volatile memory (e.g., a solid-state drive, a hard disk drive, flash memory, and the like). In some examples, the computing platform 200 can be implemented as one or more servers that execute application software on top of an operating system.

The memory 204 includes a maneuver recommendation engine 206. The maneuver recommendation engine 206 can be programmed to compute at least two flight paths through the adverse weather condition. For example, if the adverse weather condition is a multicellular storm, the maneuver recommendation engine 206 can be programmed to compute at least two flight paths through the multicellular storm. The maneuver recommendation engine 206 can employ an MLM model 208, such as the MLM model 102, as illustrated in FIG. 1. The MLM model 208 can be generated by an MLM algorithm based on learned weather maneuver data to generate the MLM model, as described herein.

In some examples, the MLM model 208 can be programmed to receive MLM input data 210. The MLM input data 210 can include at least weather sensor data (e.g., such as the weather sensor data 106, as illustrated in FIG. 1), other sensor data (e.g., the other sensor data 108, as illustrated in FIG. 1), and flight mission data (e.g., the flight mission data 110, as illustrated in FIG. 1). In some examples, the MLM model 208 can be programmed to communicate with a past adverse weather condition database 212. The past adverse weather condition database 212 can characterize one or more past adverse weather conditions detected (e.g., observed) and/or experienced by the aerial vehicle. Thus, the past adverse weather condition database 212 can characterize past weather development patterns detected or experienced by the aerial vehicle. In some examples, the past adverse weather condition database 212 can include the learned weather maneuver data as described herein.

The MLM model 208 can be programmed to communicate with the past adverse weather condition database 212 to retrieve past adverse weather condition data to predict or anticipate a weather pattern of the adverse weather condition based on the past adverse weather condition data and the MLM input data 210. In some examples, the MLM model 208 can be programmed to predict convective cell development, movement, and/or precipitation intensity based on the adverse weather condition data and the MLM input data 210. For example, the MLM model 208 can be programmed to evaluate the weather sensor data characterizing the adverse weather condition (e.g., movement, direction of movement, precipitation intensity, wind speed, and the like) and the past weather condition data to identify the at least two flight paths through the adverse weather condition.

In some examples, the MLM model 208 can be programmed to identify at least one flight path through the adverse weather condition. The MLM model 208 can be programmed to generate flight path recommendation data 214 that can characterize the at least one flight path through the adverse weather condition. The flight path recommendation data 214 can characterize flight instructions and/or commands for the aerial vehicle to implement to maneuver the aerial vehicle with respect to the adverse weather condition. Thus, in some examples, each flight path characterized by the flight path recommendation data 214 can refer to a set of flight instructions and/or commands for the vehicle to implement such that the aerial vehicle can be maneuvered.

In further examples, the MLM model 208 can be programmed to compute a flight path confidence score for each of the at least two flight paths (e.g., for the set of flight instructions and/or commands for maneuvering the aerial vehicle) through the adverse weather condition. The flight path confidence score can be indicative of a probability of successfully maneuvering the aerial vehicle through the adverse weather condition according to a respective flight path of the at least two flight paths. The MLM model 208 can be programmed to generate confidence risk data 216 that can characterize each flight path confidence score. In some examples, the flight path recommendation data 214 and the confidence risk data 216 can collectively correspond to the maneuver data 112, as illustrated in FIG. 1.

The memory 204 can further include a maneuver decision engine 218. In some examples, the maneuver decision engine 218 can correspond to the maneuver decision engine 104, as illustrated in FIG. 1. Thus, in some examples, MLM model 208 and the maneuver decision engine 218 can be collectively referred to the AWF control system 100, as illustrated in FIG. 1. The maneuver decision engine 218 can be programmed to receive the flight path recommendation data 214 and the confidence risk data 216. The maneuver decision engine 218 can be programmed to evaluate each flight path confidence score for each flight path of the at least two flight paths relative to a flight path confidence threshold to identify a given flight path of the at least two flight paths through the adverse weather condition that poses a least amount of risk of damage to the aerial vehicle by the adverse weather condition. The flight path confidence threshold can correspond to a level of risk that has been selected or determined as acceptable for the aerial vehicle. The flight path confidence threshold can be user-defined.

In some examples, the maneuver decision engine 218 employs a vehicle control module 220. The vehicle control module 220 can be programmed to receive maneuver control data 222 according to which the aerial vehicle was initially configured to operate (e.g., at an on-set of the mission). The maneuver control data 222 can define one or more flight rules for the aerial vehicle that can restrict maneuvering the aerial vehicle through the adverse weather condition. The vehicle control module 220 can be programmed to determine whether the aerial vehicle is to maneuver through the adverse condition according to at least one of the flight two paths or maneuver around the adverse condition based on the confidence risk data 216. Thus, in some examples, the vehicle control module 220 can be programmed to override the one or more rules restricting maneuvering the aerial vehicle through the adverse weather condition based on the confidence risk data 216.

For example, the vehicle control module 220 can be programmed to compare each flight path confidence score relative to the flight path confidence threshold to identify a respective flight path of the at least two flight paths that is greater than the flight path confidence threshold. In some examples, if neither of the at least two flight paths is greater than the flight path confidence threshold, the vehicle control module 220 can be programmed to generate flight control data 224 characterizing flight control commands for the aerial vehicle for maneuvering the aerial vehicle around the adverse weather condition. In some examples, if the respective flight path of the at least two flight paths is greater than the flight path confidence threshold, the vehicle control module 220 can be programmed to generate the flight control data 224 with flight control commands that can be used to maneuver the aerial vehicle according to the respective flight path through the adverse weather condition. By way of further example, if each flight path confidence score is greater than the flight path confidence threshold, the vehicle control module 220 can be programmed to identify the respective flight path through the adverse weather condition based on a greatest flight path confidence threshold among flight path confidence scores for the at least two flight paths. In other examples, a different confidence score processing scheme can be used to identify the respective flight path through the adverse weather conditions (e.g., highest confidence, median confidence, mean confidence, and the like).

In some examples, the vehicle control module 220 can be programmed to receive the flight mission data of the MLM input data 210. The flight mission data can be indicative of a level of importance of a mission being implemented by the aerial vehicle. The vehicle control module 220 can be programmed to evaluate the flight mission data relative to a mission importance threshold. If the flight mission data is indicative that the mission has a critical level of importance and thus is greater than the mission importance threshold, the vehicle control module 220 can be programmed select the respective flight path of the at least two flight paths through the adverse weather condition that has minimal or no impact on the aerial vehicle completing the mission. Thus, in some examples, if a corresponding flight path of the at least two flight paths poses a greater amount of structural risk to the aerial vehicle than a remaining flight path of the at least two flight paths, that flight path through the adverse weather condition can be identified (e.g., selected) if the mission is deemed critical.

In some examples, if the corresponding flight path of the at least two flight paths poses a less amount of structural risk to the aerial vehicle than a remaining flight path of the at least two flight paths, the corresponding flight path can be identified (e.g., selected) in response to determining that the mission is deemed not critical. The mission is deemed not critical by the maneuver decision engine 218 in response to determining that the flight mission data is less than the mission importance threshold. Although examples are presented herein with respect to FIG. 2 wherein at least two flight paths are identified through the adverse weather condition, in other examples, a single flight path can be identified. The flight control data 224 can be employed to cause the aerial vehicle to maneuver according to the respective flight path through the adverse weather condition.

In some examples, the maneuver decision engine 218 can be programmed to generate MLM tuning data 226 indicative of whether the given flight path is one a safe flight route or an unsafe flight route in response to maneuvering the aerial vehicle according to the given flight path through adverse weather condition. In some examples, the MLM tuning data 226 can correspond to the MLM tuning data 116, as illustrated in FIG. 1. The maneuver decision engine 218 can be programmed to cause the MLM model 208 to be updated based on the MLM tuning data 226, as described herein (e.g., with respect to FIG. 1). In some examples, the maneuver decision engine 218 can be programmed to evaluate structural data (e.g., the structural data 118, as illustrated in FIG. 1) generated by one or more structural sensors characterizing a structural integrity of the aerial vehicle relative to a structural integrity threshold in response to maneuvering the aerial vehicle through the adverse weather condition. The maneuver decision engine 218 can be programmed to determine whether the given flight path through the adverse weather condition is to be identified as one of the safe flight route or the unsafe flight route based on the evaluation and generate corresponding MLM tuning data 226. Accordingly, the MLM model 208 can be tuned based on corresponding MLM tuning data 226 following each maneuver of the aerial vehicle with respect to the adverse weather condition to improve the quality of flight path recommendations being provided by the MLM model 102 through adverse weather conditions.

In some examples, the maneuver decision engine 218 can include a flight path GUI generator 228. The flight path GUI generator 228 can be configured to generate flight path GUI data 230 for displaying on a user interface (e.g., a display). The flight path GUI data 230 can include one or more radar graphical images generated by an on-board radar weather system of the aerial vehicle. Thus, the flight path GUI generator 228 can be programmed to communicate with the on-board radar weather system to retrieve radar information characterizing the adverse weather condition to generate the one or more radar graphical images. The flight path GUI generator 228 can be programmed to overlay each flight path of the plurality of flight paths over the radar graphical image to generate the flight path GUI data 230. In some examples, the pilot may not able to discern (e.g., decide) which of the plurality flight paths poses a least amount of structural risk to the aerial vehicle. The pilot can interact with an input device on the aerial device to alert the maneuver decision engine 218 to determine the safest flight route of the at least two flight paths, and automatically maneuver the aerial vehicle through the adverse weather condition according to a selected flight path of the plurality of flight paths.

Accordingly, the computing platform 200 can enable the aerial vehicle to identify a flight path through the adverse weather condition that poses an acceptable level of risk to the aerial vehicle. Accordingly, the maneuver decision engine 218 can be programmed to override the maneuver control data 222 according to which the aerial vehicle was initially configured to operate (e.g., at an on-set of the mission) in response to identifying a respective flight path through the adverse weather condition with an acceptable amount of structural risk to the aerial vehicle. Therefore, the computing platform 200 can determine a penetration path through dangerous localized weather.

Figure 3:
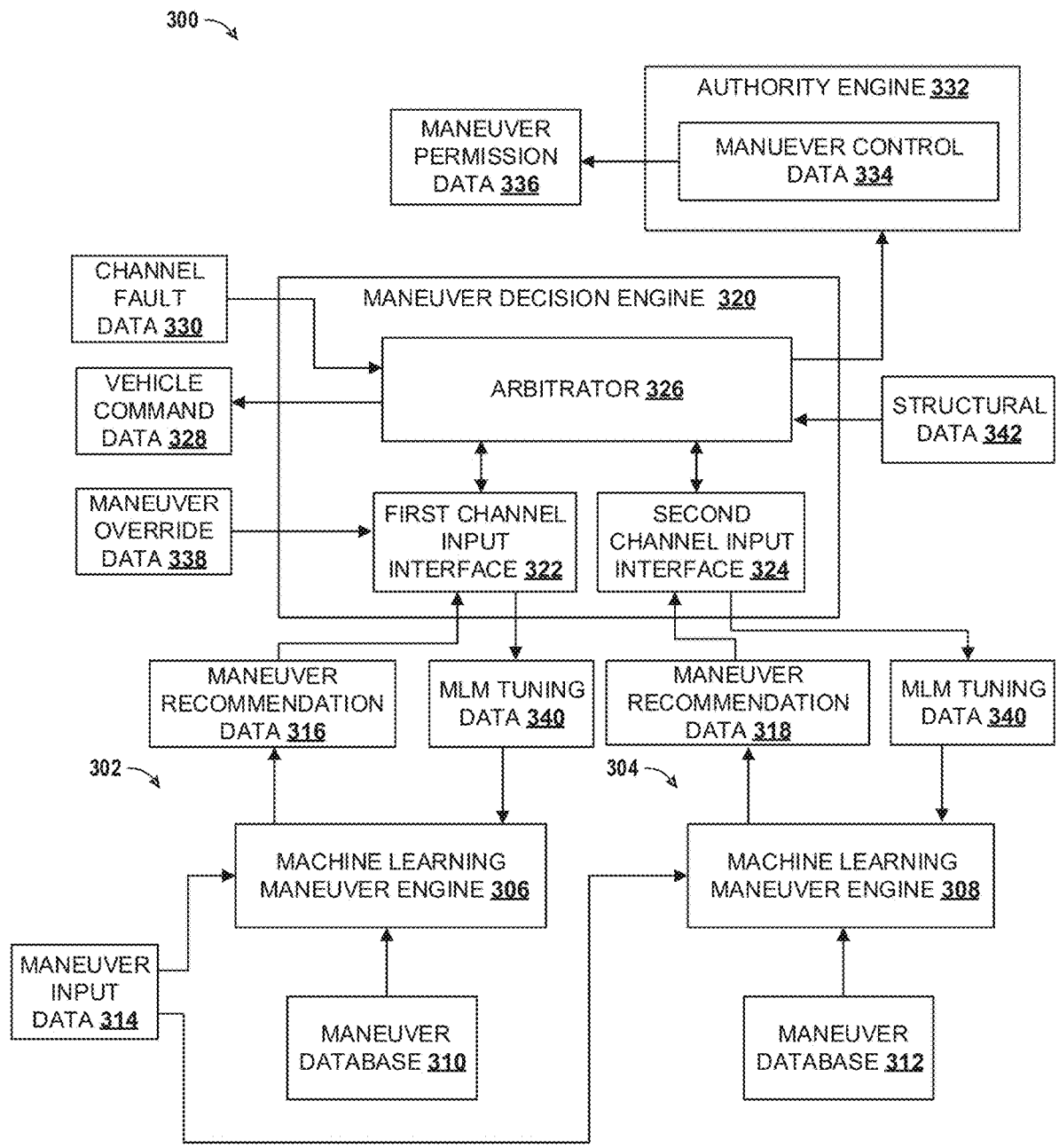
FIG. 3 illustrates an example of a flight control system of an aerial vehicle.

FIG. 3 illustrates an example of a flight control system 300 of an aerial vehicle. In some examples, the flight control system 300 can be configured with an AWF control system (e.g., the AWF control system 100, as illustrated in FIG. 1) to implement maneuvers with respect to adverse weather conditions. By way of example, the flight control system 300 includes a first channel 302 and a second channel 304. The flight control system 300 can be representative of a primary flight control system of the aerial vehicle. By implementing the flight control system 300 with two channels, the flight control system can reduce channel faults and systematic errors. In other examples, the flight control system 300 can be a secondary flight control system and can be operated in response to the primary flight control system experiencing a fault. Each of the first and second channels 302 and 304 can include one or more processors that can include a memory. The one or more processors can access a corresponding channel memory and execute machine-readable instructions stored therein. Each memory channel 302 and 304 can include a respective MLM engine 306 and 308. Each of the MLM engines 306 and 308 can be programmed to provide maneuver recommendations for controlling aerial actions and/or movements of the aerial vehicle.

In some examples, the MLM engines 306 and 308 can respectively correspond to the MLM model 102, as illustrated in FIG. 1 or the MLM model 208, as illustrated in FIG. 2. In some examples, the MLM engines 306 and 308 can include the MLM model 102 or the MLM model 208. In some examples, the MLM engines 306 and 308 can include or correspond to the maneuver recommendation engine 206, as illustrated in FIG. 2. In further examples, the MLM engines 306 and 308 can correspond to respective MLM models that have been generated based on maneuver data. The maneuver data can characterize a plurality of maneuvers implemented by one or more aerial vehicles with respect to obstacles, objects, flight control rules, and/or mission parameters. In some examples, the maneuver data can characterize a plurality of past aerial conditions and associated maneuvers or actions implemented by one or more aerial vehicles with respect to a corresponding aerial condition of the plurality of aerial conditions. Thus, in some examples, the MLM engines 306 and 308 can be programmed to identify flight paths with respect to adverse weather conditions, as described herein.

In some examples, each of the first and second channels 302 and 304 can include a maneuver database 310 and 312. The maneuver databases 310 and 312 can include past maneuver data characterizing one or more past maneuvers implemented by the aerial vehicle with respect to obstacles detected or sensed by the aerial vehicle, objects detected or sensed by the aerial vehicle, flight control rules for controlling maneuvers of the aerial vehicle, and/or mission parameters of previous missions implemented by the aerial vehicle. In some examples, the past maneuver data can characterize one or more past adverse weather conditions detected (e.g., observed) and/or experienced by the aerial vehicle. Thus, the maneuver databases 310 and 312 can characterize past weather development patterns detected or experienced by the aerial vehicle. In some examples, the MLM engines 306 and 308 can be programmed to receive maneuver input data 314. The maneuver input data 314 can include sensor data from one or more sensors on-board of the aerial vehicle that can be employed to implement maneuvers by the aerial vehicle.

In some examples, the aerial vehicle includes one or more sensors and can store the sensor data from the one or more sensors at a storage location of the aerial vehicle that can be accessed by each of the MLM engines 306 and 308. The one or more sensors can include cameras, gyroscopes, laser altimeters, accelerometers (e.g., 3-axis accelerometers connected to a Global Positioning System (GPS) and an Inertial Measurement Unit (IMU) to compute accurate position and orientation), vehicle speed-sensors, direction, compass heading, wind sensors, light sensors, laser rangefinders, microphones, speakers, pressure transducers, thermometers, barometers, Sound Detection And Ranging (SONAR) sensors, a ground-penetrating radar, Light Detection And Ranging (LIDAR) sensors, laser illumination systems radar sensors, magnetometers, day/night light sensors, optical beacon locators, laser illumination systems, gimbal input systems, voice input detection microphone-bases systems, RF receivers and transmitters, weather sensors (e.g., for detecting temperature, wind, rain, snow, hail, lightning, thunder, and the like), defense sensors (e.g. gunfire locator systems, explosion locator systems, and the like). Thus, in some examples, the maneuver input data can include weather sensor data (e.g., such as the weather sensor data 106, as illustrated in FIG. 1), other sensor data (e.g., the other sensor data 108, as illustrated in FIG. 1), and flight mission data characterizing a respective mission and one or more mission parameters (e.g., the flight mission data 110, as illustrated in FIG. 1).

In some examples, such during flight, each of the MLM engines 306 and 308 can be programmed to receive the past maneuver data from a corresponding maneuver databases 310 and 312, and the maneuver input data 314. Each MLM engine 306 and 308 can be programmed to generate maneuver recommendation data 316 and 318 for maneuvering the aerial vehicle, such as during a mission. In some examples, the maneuver recommendation data 316 and 318 can include or identify at least one flight path through the adverse weather condition. The maneuver recommendation data 316 and 318 can characterize flight instructions and/or commands for the aerial vehicle to implement to maneuver the aerial vehicle (e.g., with respect to the adverse weather condition). Thus, the maneuver recommendation data 316 and 318 generated by each MLM engine 306 and 308 can characterize a recommended maneuver for the aerial vehicle.

In further examples, each of the MLM engines 306 and 308 can be programmed to compute a maneuver confidence score for each recommended maneuver characterized by the maneuver recommendation data 316 and 318. The maneuver confidence score can be indicative of a probability of the aerial vehicle suffering structural damage in response to implementing the recommended maneuver. In some examples, the maneuver confidence score can be indicative of a probability of successfully maneuvering the aerial vehicle through the adverse weather condition according to a respective flight path. The maneuver confidence score for each recommended maneuver can be provided as part of the maneuver recommendation data 316 and 318.

The flight control system 300 can include a maneuver decision engine 320. In some examples, the maneuver decision engine 320 can correspond to or include the maneuver decision engine 104, as illustrated in FIG. 1 or the maneuver decision engine 218, as illustrated in FIG. 2. The maneuver decision engine 320 can include a first channel input interface 322 and a second channel input interface 324. The first channel input interface 322 can be programmed to receive the maneuver recommendation data 316 provided by the MLM engine 306. The second channel input interface 324 can be programmed to receive the maneuver recommendation data 318 provided by the MLM engine 308. Each of the first and second channel input interfaces 322 and 324 can be programmed to provide respective maneuver recommendation data 316 and 318 to an arbitrator 326 of the maneuver decision engine 320. In some examples, the arbitrator 326 can correspond to or include the vehicle control module 220, as illustrated in FIG. 2.

The arbitrator 326 can be programmed to determine which maneuver recommendation data 316 and 318 and thus recommended maneuver is to be employed to generate vehicle command data 328 for implementing the recommended maneuver by the aerial vehicle. In some examples, the vehicle command data 328 can correspond to or include the flight control data 114, as illustrated in FIG. 1 or the flight control data 224, as illustrated in FIG. 2. Thus, in some examples, the vehicle command data 328 can characterize flight control commands for the aerial vehicle for maneuvering the aerial vehicle around or through the adverse weather condition.

In some examples, the arbitrator 326 can be programmed to determine whether if any of the first and second channels 302 and 304 are experiencing a channel fault. For example, the arbitrator 326 can be programmed to receive channel fault data 328 characterizing any channel faults that can be present within the first and second channels 302 and 304. A channel fault can correspond to any channel condition that can induce errors (e.g., data errors, maneuver recommendations, and the like) in a corresponding channel. By way of example, the channel fault can correspond to a buffer overrun fault, an input data overrun fault, an initialization fault, and the like. In some examples, the channel fault can cause respective MLM engines 306 and 308 to output different maneuver recommendation data 316 and 318 and/or maneuver recommendation data 316 and 318 with different maneuver confidence scores for implementing a respective maneuver.

In some examples, the arbitrator 326 can be programmed to compare each maneuver confidence score from corresponding maneuver recommendation data 316 and 318 to determine whether the maneuver confidence scores match. If the maneuver confidence scores match and similar maneuvers are being recommended by the maneuver recommendation data 316 and 318, the arbitrator 326 can be programmed to compare a respective maneuver confidence score from the corresponding maneuver recommendation data 316 and 318 to a maneuver confidence threshold to determine whether the recommended maneuver is to be implemented by the aerial vehicle. In some examples, the maneuver confidence threshold corresponds to the flight path confidence threshold, as described herein. The maneuver confidence threshold can correspond to a level of risk that has been selected or determined as acceptable for implementing maneuvers by the aerial vehicle. If the respective maneuver confidence score is greater than or equal to the maneuver confidence threshold, the arbitrator 326 can be programmed to generate the vehicle command data 328 to implement the recommended maneuver.

In some examples, if the respective maneuver confidence score is less than the maneuver confidence threshold, the arbitrator 326 can be programmed to communicate with each corresponding MLM engine 306 and 308 to receive updated maneuver recommendation data that includes an updated maneuver recommendation and a respective maneuver confidence score for the updated maneuver recommendation. The arbitrator 326 can be programmed to evaluate the updated maneuver recommendation data as described herein to determine whether the updated maneuver recommendation is to be implemented by the aerial vehicle.

In some examples, the maneuver confidence score does not match, however, similar maneuvers are being recommended by the maneuver recommendation data 316 and 318. The arbitrator 326 can be programmed to select a highest maneuver confidence score among the maneuver confidence scores and compare the selected maneuver confidence score to the maneuver confidence threshold to determine whether the corresponding maneuver recommendation is to be implemented by the aerial vehicle. If the highest maneuver confidence score is less than the maneuver confidence threshold, the arbitrator 326 can be programmed to communicate with each corresponding MLM engine 306 and 308 to receive the updated maneuver recommendation data and thus determine whether the updated maneuver recommendation is to be implemented.

In some examples, each of the first and second channels 302 and 304 can include faults based on the channel fault data 330. For example, the first channel 302 can include a major channel fault (e.g., buffer overrun), and the second channel 304 can include a minor channel fault. The arbitrator 326 can be programmed to select the maneuver confidence score associated with the second channel 304 as this channel is not experiencing the major channel fault as the first channel 302 based on the channel fault data 330. The arbitrator 326 can be programmed to compare the maneuver confidence score associated with the second channel 304 to the maneuver confidence threshold to determine whether the corresponding maneuver recommendation is to be implemented by the aerial vehicle.

In some examples, the arbitrator 326 can be programmed to communicate the recommended maneuver to an authority engine 332. The authority engine 332 can be programmed to evaluate the recommended maneuver to determine whether the recommended maneuver violates any maneuver rules of the maneuver control data 334 for the aerial vehicle. In some examples, the maneuver control data 334 can correspond to or include the maneuver control data 222, as illustrated in FIG. 2. Thus, in some examples, the maneuver control data 334 can include a weather restriction rule that can restrict maneuvering of the aerial vehicle through the adverse weather condition and an airspace boundary rule that can restrict maneuvering the aerial vehicle into unpermitted airspace. In some examples, the maneuver control data 334 can include an airspeed flight restriction rule that set a top speed of the aerial vehicle, a number of degrees of heading change rule that set a permitted heading change for the area vehicle, and the like. Thus, the maneuver control data 334 can include any type of rule that can control the maneuvers (e.g., actions of the aerial vehicle, flight paths of the aerial vehicle, and the like) of the aerial vehicle. In some examples, the maneuver control data 334 can include mission parameter data that can control maneuvers of the aerial vehicle with respect to a corresponding mission.

In some examples, the authority engine 332 can employ the maneuver control data 334 to set or define authority limits for the maneuver decision engine 320 and thus limit maneuvers or control types of maneuvers that can be implemented by the aerial vehicle. For example, the authority engine 332 can be programmed to evaluate the recommended maneuver provided by the arbitrator 326 to determine whether the recommended maneuver violates the maneuver control data 334. The authority engine 332 can be programmed to output maneuver permission data 336 indicative of whether the recommended maneuver violates the maneuver control data 334. Thus, the maneuver permission data 336 can indicate whether the recommended maneuver is permitted or allowed to be implemented by the aerial vehicle.

In some examples, the arbitrator 326 can be programmed to override the maneuver control data 334 such as in response to determining that the maneuver confidence score is greater than the maneuver confidence score threshold. For example, if the recommended maneuver corresponds to a respective flight path through the adverse weather condition, the arbitrator 326 can be programmed to ignore the maneuver permission data 336 indicating that the recommended maneuver violates the weather restriction rule of the maneuver control data 334 and provide the vehicle command data 328 to implement maneuvering of the aerial vehicle through the adverse weather condition. Accordingly, the arbitrator 326 can be programmed to override the maneuver control data 334 in adverse weather condition scenarios, such that the aerial vehicle can be maneuvered through the adverse weather condition.

By way of further example, the arbitrator 326 can be programmed to output the vehicle command data 328 based on the maneuver permission data 336 indicating that the recommended maneuver is permitted to be implemented by the aerial vehicle. In other examples, if the maneuver permission data 336 indicates that the recommended maneuver is not permitted to be implemented by the aerial vehicle, the arbitrator 326 can be programmed to communicate with each corresponding MLM engine 306 and 308 to receive the updated maneuver recommendation. In some examples, the arbitrator 326 can be programmed to receive maneuver override data 338 characterizing a different maneuver than being recommended to be implemented by the maneuver decision engine 320. The maneuver override data 338 can be provided by another system on-board of the aerial vehicle or be communicated by a base station to the aerial vehicle. The maneuver override data 338 can override the recommended maneuver and cause the arbitrator 326 to generate vehicle command data 328 to implement the other maneuver being characterized by the maneuver override data 334.

In some examples, the arbitrator 326 can be programmed to generate MLM tuning data 340. The MLM tuning data 340 can be employed to update each respective MLM engine 306, such that the recommended maneuver is one emphasized in response to determining that the recommended maneuver is a safe maneuver or deemphasized in response to determining that the recommended maneuver is an unsafe maneuver, for a subsequent maneuver recommendation. A safe maneuver can correspond to an aerial vehicle maneuver that does not result in structural damage to the aerial vehicle that is equal to or greater than a level of structural risk that has been selected or determined as acceptable for the aerial vehicle. In some examples, the safe maneuver and the unsafe maneuver can correspond to safe and unsafe flight paths, as described herein.

In some examples, the structural integrity of the vehicle can be determined based on structural data 342 (e.g., the structural data 118, as illustrated in FIG. 1) and evaluated relative to a structural integrity threshold in response to implementing the recommended maneuver. For example, the arbitrator 326 can be programmed to evaluate the structural data 342 relative to a structural integrity threshold to determine whether the recommended maneuver is to be flagged or identified as a safe or unsafe maneuver. Thus, each of the MLM engines 306 and 308 can be tuned following each recommended maneuver of the aerial vehicle to improve a quality of maneuver recommendations, such that the maneuver recommendations that have minimal impact on the structural integrity of the aerial vehicle and/or mission being implemented by the aerial vehicle. Accordingly, the flight control system 300 can be configured with machine learning technology to control maneuvers being implemented by the aerial vehicle.

Figure 4:
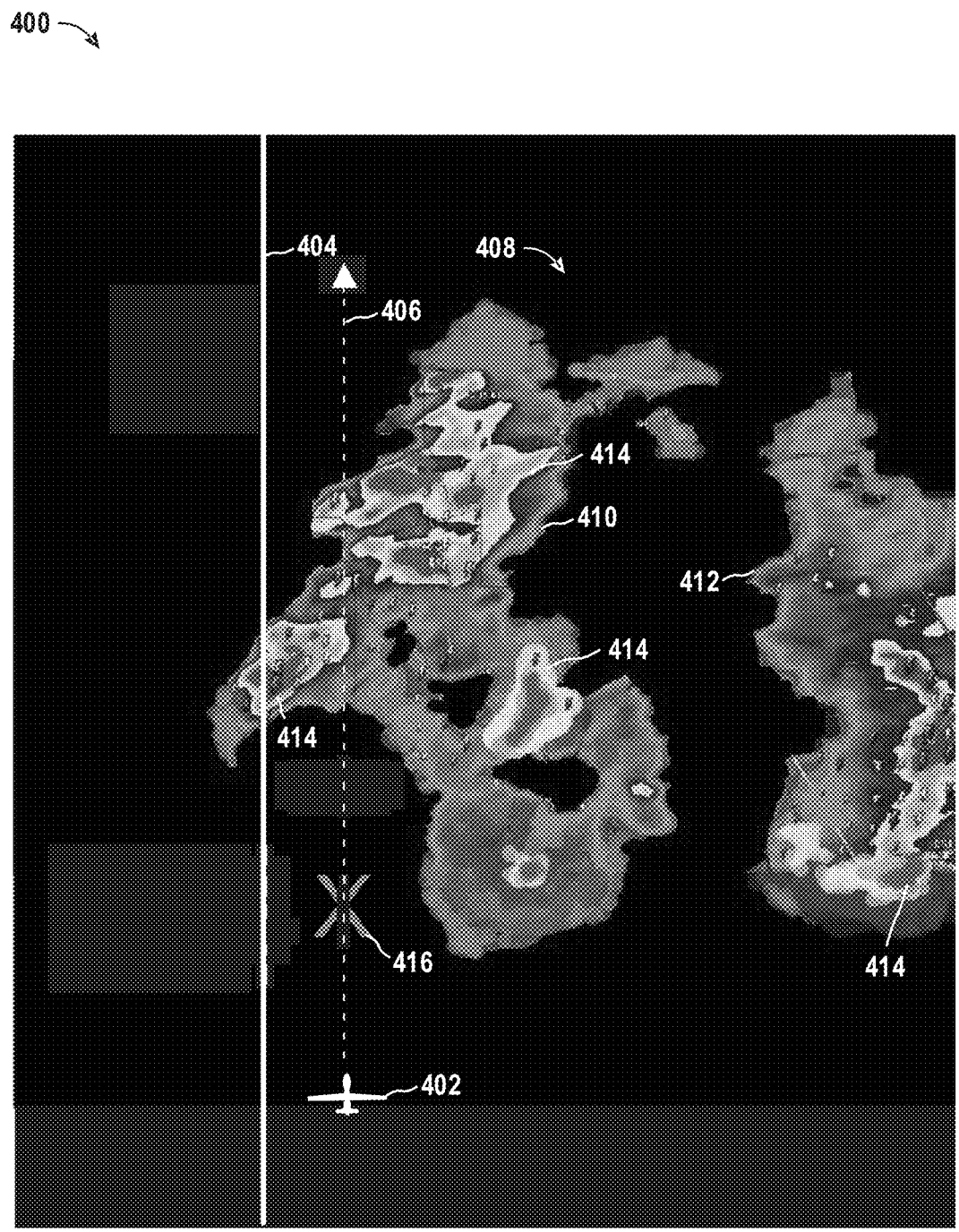
FIGS. 4-6 illustrate example graphical illustrations of an aerial vehicle operating without an AWF control system during an adverse weather condition.
Figure 5:
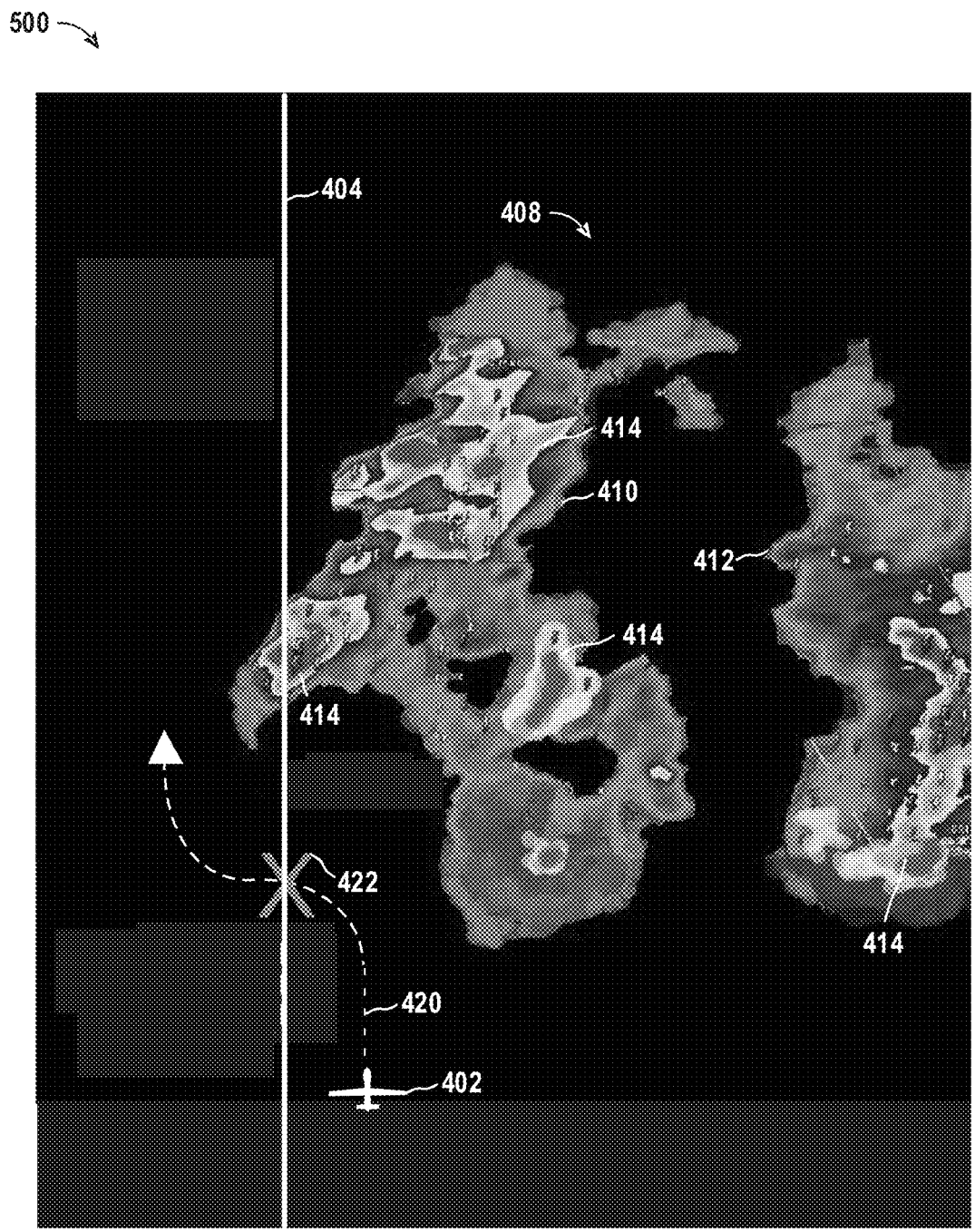
Figure 6:
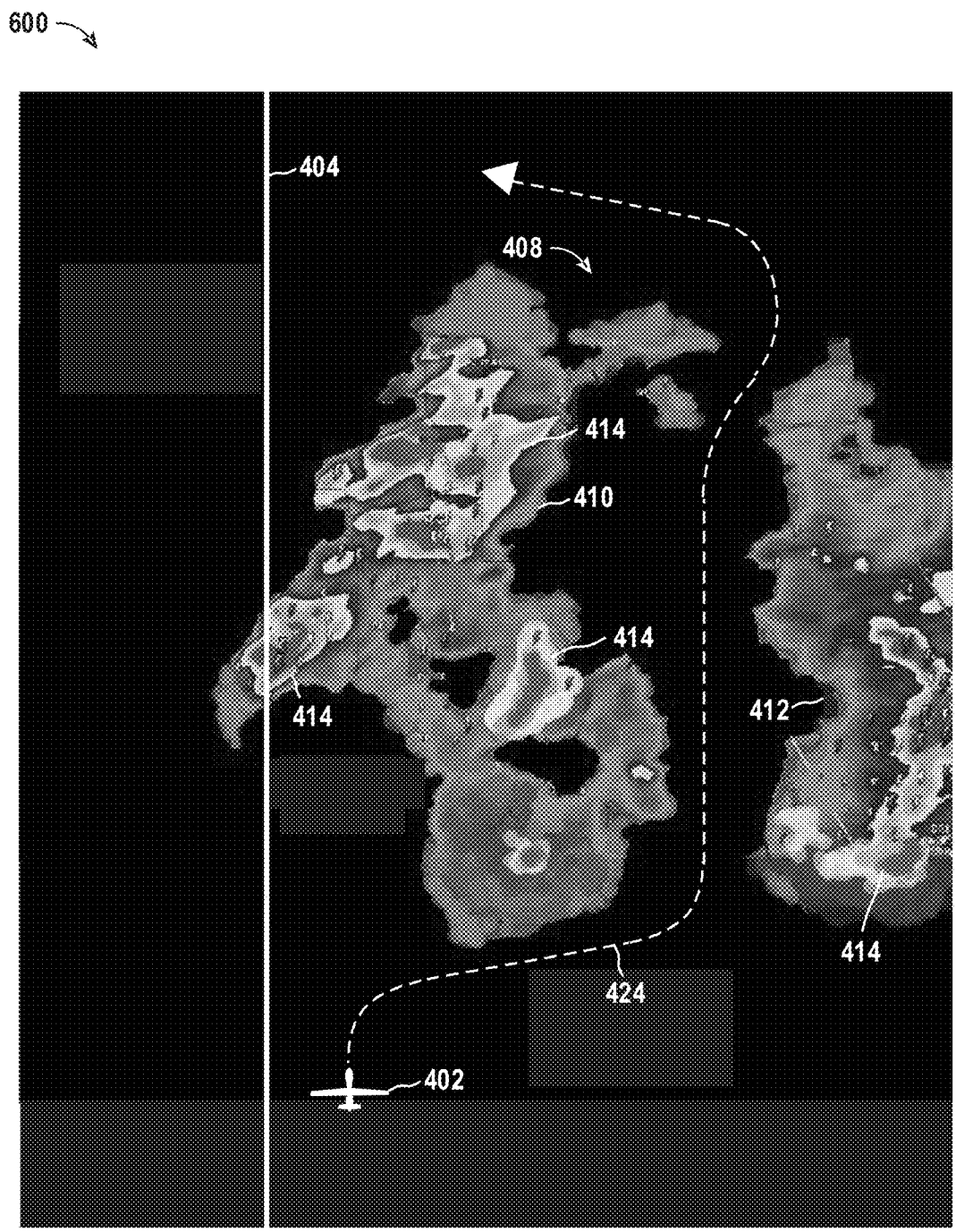

FIGS. 4-6 illustrate example graphical illustrations 400-600 of an aerial vehicle 402 operating without an AWF control system (e.g., the AWF control system 100, as illustrated in FIG. 1) in adverse weather conditions. The example graphical illustrations 400-600 can correspond to radar graphical images (e.g., that can be generated by an on-board radar system of the aerial vehicle 402). In some examples, the aerial vehicle 402 can be configured to operate according to maneuver control data (e.g., the maneuver control data 222, as illustrated in FIG. 2) that can include one or more maneuver rules that can restrict maneuvers of the aerial vehicle 402, such as during a mission. For example, the maneuver control data can include an airspace boundary rule restricting flight of the aerial vehicle 402 across an airspace boundary 404, as illustrated in FIGS. 4-6. In some examples, the aerial vehicle 402 can be configured to fly according to a current flight path 406 that has been determined for the aerial vehicle, as illustrated in FIGS. 4-6.

During flight, a multicellular storm 408 can develop which can move into the current flight path 406 of the aerial vehicle 402, as illustrated in FIG. 4. The multicellular storm 408 can include storm cells 410 and 412, as illustrated in FIGS. 4-6. In some examples, each storm cell 410 and 412 can be at a different stage in a life cycle of a thunderstorm or in similar stages in the life cycle of the thunderstorm. The multicellular storm 408 and thus each storm cell 410 and 412 can produce hail, lightning, strong winds, and/or tornadoes. By way of example, each of the storm cells 410 and 412 can include one or more weather cell portions 414 that can increase a likelihood and thus risk of structural damage to the aerial vehicle 402. For example, the one or more weather cell portions 414 can correspond to yellow, orange, and/or red radar colors of a weather radar image, and thus can be indicative of adverse weather conditions that increase the likelihood of the aerial vehicle 402 suffering structural damage.

In some examples, the maneuver control data can include a weather restriction rule that can restrict maneuvering of the aerial vehicle 402 through the multicellular storm 408. As such, the aerial vehicle 402 is not permitted to fly through the multicellular storm 408, as illustrated at 416, in FIG. 4. Moreover, because the maneuver control data can include the airspace boundary rule, the aerial vehicle 402 is not permitted, for example, as illustrated at 418 in FIG. 5, to fly along an alternative flight path 420 into restricted airspace and thus cross the airspace boundary 404, as illustrated at 422, in FIG. 5. As a result, the aerial vehicle 402 is maneuvered (e.g., by the pilot in examples wherein the aerial vehicle is pilot-operated or remotely by a user in examples wherein the aerial vehicle is a UAV) along another alternative flight path 424 that avoids maneuvering the aerial vehicle 402 through the multicellular storm 408. For example, as illustrated in FIG. 6, the aerial vehicle 402 can be maneuvered between the storm cells 410 and 412 of the multicellular storm 408 along the alternative flight path 424. Because the aerial vehicle 402 is required to take a longer flight path by going around the storm cell 410, the aerial vehicle 402 can expand more resources (e.g., fuel) to complete such a maneuver.

In some examples, by the aerial vehicle 402 going around the storm cell 410, the aerial vehicle 402 may fail to complete the mission within a defined period of time or undermine the mission. In some examples, if the mission has been designated as critical (e.g., has to be completed with the defined period of time), the operator or the pilot can maneuver the aerial vehicle 402 along the alternative flight path 424 and risk potentially failing to complete the mission with defined mission parameters. In other examples, the human or operator may determine to maneuver the aerial vehicle 402 across the airspace boundary 404 into the restricted airspace, which in some examples, can be hostile territory, thereby posing substantial combat risk to the aerial vehicle (e.g., being shut down). In some examples, the multicellular storm 408 can exhibit lighting which can create disturbances in an ionosphere that can perturb and distort radio communication with the aerial vehicle 402, and thus not permit the user (e.g., ground operator) to change a course of the aerial vehicle 402 from the current flight path 406 to the alternative flight path 424, thereby putting the aerial vehicle 402 in risk of being damaged by the storm cell 410 if the aerial vehicle 402 continues to travel along the current flight path 406 through the storm cell 410, as illustrated in FIG. 4. Accordingly, by employing the aerial vehicle 402 without the AWF control system, as described herein, can undermine the mission, a life of the aerial vehicle 402, and/or the structural integrity of the aerial vehicle 402.

Figure 7:
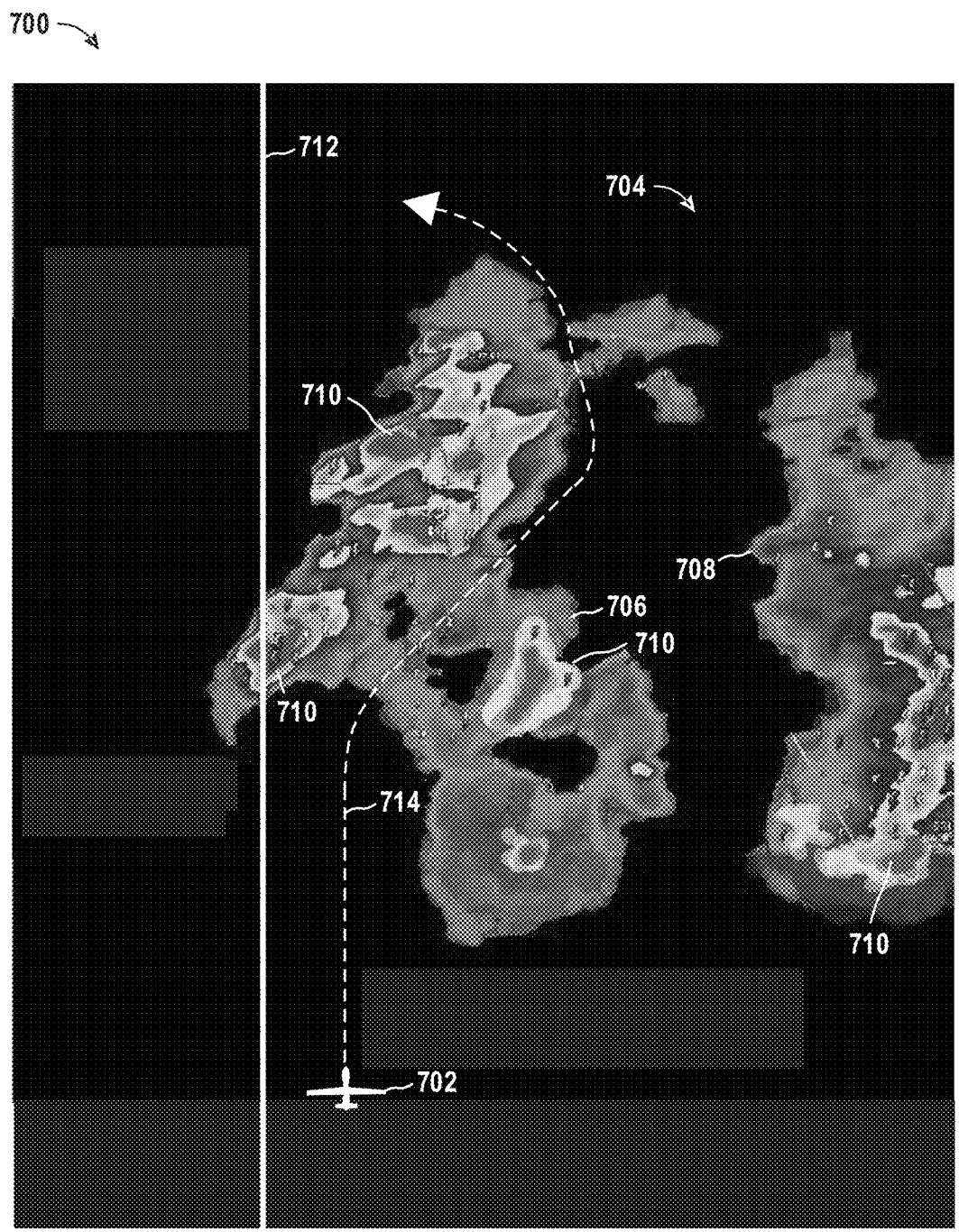
FIGS. 7-8 illustrate example graphical illustrations of an aerial vehicle operating with an AWF control system during an adverse weather condition.
Figure 8:
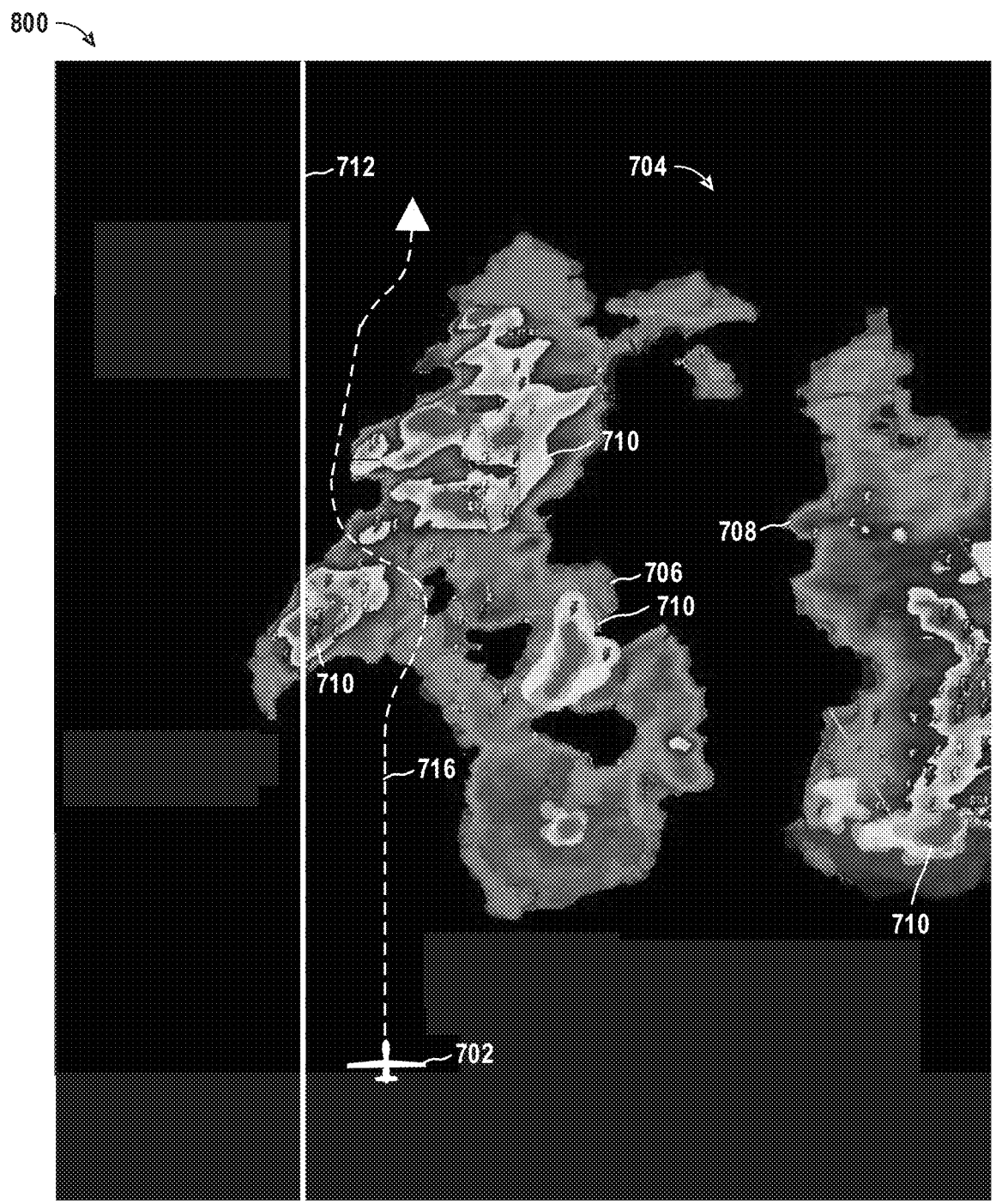

FIGS. 7-8 illustrate example graphical illustrations 700-800 of an aerial vehicle 702 operating with an AWF control system (e.g., the AWF control system 100, as illustrated in FIG. 1) in adverse weather conditions. The example graphical illustrations 700-800 can correspond to radar graphical images (e.g., which can be generated by an on-board radar system of the aerial vehicle 702). During the flight of the aerial vehicle 702, a multicellular storm 704 can develop which can move into a current flight path of the aerial vehicle 702. The multicellular storm can include storm cells 706 and 708, as illustrated in FIGS. 7-8. In some examples, each storm cell 706 and 708 can be at a different stage in a life cycle of a thunderstorm or in similar stages in the life cycle of the thunderstorm. The multicellular storm 704 and thus each storm cell 706 and 708 can produce hail, lightning, strong winds, and/or tornadoes. By way of example, each of the storm cells 706 and 708 can include one or more weather cell portions 710 that can increase a likelihood and thus risk of structural damage to the aerial vehicle 702. For example, the one or more weather cell portions 710 can correspond to yellow, orange, and/or red radar colors of a weather radar image, and thus can be indicative of adverse weather conditions that increase the likelihood of the aerial vehicle being damaged.

In some examples, the aerial vehicle 702 can be configured to operate according to maneuver control data (e.g., the maneuver control data 222, as illustrated in FIG. 1). The maneuver control data can include an airspace boundary rule restricting flight of the aerial vehicle 702 across an airspace boundary 712, as illustrated in FIGS. 4-6. In some examples, the maneuver control data can include a weather restriction rule that can restrict maneuvering of the aerial vehicle 702 through the multicellular storm 704. As such, the aerial vehicle 702 can be not permitted to fly through the multicellular storm 704. However, because the aerial vehicle 702 is configured with the AWF control system as described herein, the AWF control system can identify a first and/or second flight path 714 and 716 through the multicellular storm 704, and cause the aerial vehicle 702 to be maneuvered through the multicellular storm 704, thereby overriding the maneuver control data, such as the weather restriction rule.

In some examples, the AWF control system can be configured to identify more than one path through the multicellular storm 704, such as the second flight path 716, as illustrated in FIG. 8. The AWF control system can be configured to evaluate each of the first and second flight paths 714 and 716 and identify a given flight path for the aerial vehicle 702 as described herein that poses a least amount of structural risk to the aerial vehicle 702 through the multicellular storm 704 among the first and second flight paths 714 and 716. In some examples, the AWF control system can be configured to identify the first flight path 714 as the acceptable route to penetrate the multicellular storm 704 while having minimal or minor impact on a current mission being carried out by the aerial vehicle 702. In other examples, the AWF control system can be configured to identify the second flight path 716 as the acceptable route to penetrate the multicellular storm 704 while having no impact on the current mission being carried out by the aerial vehicle 702. Accordingly, by employing the aerial vehicle 702 with the AWF control system, as described herein, can have minimal to no impact on the mission being implemented by the aerial vehicle 702. Moreover, by configuring the aerial vehicle 702 with the AWF control system, as described herein, can ensure that given flight path through the aerial vehicle that is selected has minimal to no impact on a life and/or structural integrity of the aerial vehicle 702, thus prolonging a useful life of the aerial vehicle 702.

Figure 9:
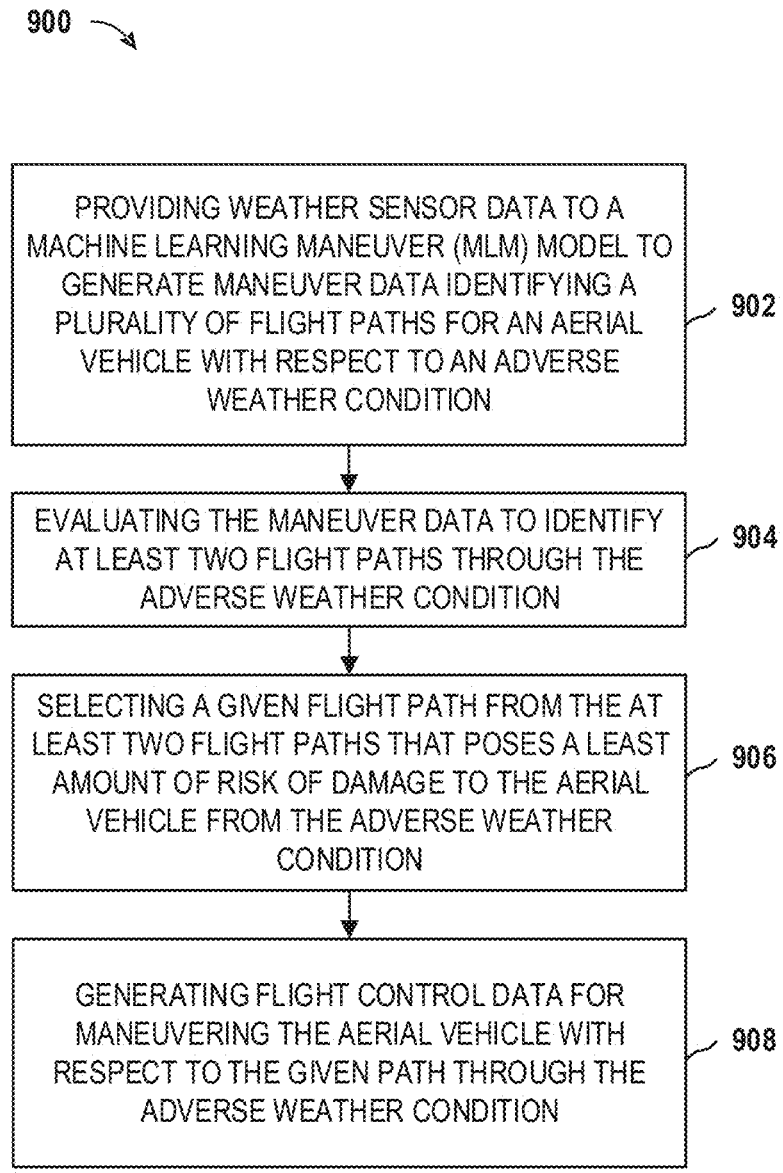
FIG. 9 illustrates an example of a method for maneuvering an aerial vehicle during an adverse weather condition.

In view of the foregoing structural and functional features described above, example methods will be better appreciated with reference to FIG. 9. While, for purposes of simplicity of explanation, the example method of FIG. 9 is shown and described as executing serially, it is to be understood and appreciated that the example method is not limited by the illustrated order, as some actions could in other examples occur in different orders, multiple times and/or concurrently from that shown and described herein.

FIG. 9 illustrates an example of a method 900 for maneuvering an aerial vehicle (e.g., the aerial vehicle 702, as illustrated in FIGS. 7-8) through an adverse weather condition (e.g., the multicellular storm 704, as illustrated in FIGS. 7-8). The method 900 can be implemented by an AWF control system, such as the AWF control system 100, as illustrated in FIG. 1. The method can begin at 902, by providing at least weather sensor data (e.g., the weather sensor data 106, as illustrated in FIG. 1) characterizing an adverse weather condition to an MLM model (e.g., the MLM model 102, as illustrated in FIG. 1) executing on a processor on an aerial vehicle (e.g., the aerial vehicle 702, as illustrated in FIG. 2) to generate maneuver data (e.g., the maneuver data 112, as illustrated in FIG. 1). The maneuver data can identify a plurality of flight paths for maneuvering the aerial vehicle through an adverse weather condition (e.g., the multicellular storm 704, as illustrated in FIGS. 7-8) and a flight path confidence score for each flight path of the plurality of flight paths. The flight path confidence score for each flight path of the plurality of flight paths can be indicative of a probability of successfully maneuvering the aerial vehicle through the adverse weather condition along a respective flight path.

At 904, evaluating each flight path confidence score for each flight path relative to a flight path confidence threshold to identify at least two flight paths (e.g., the first or the second flight path 714 and 716, as illustrated in FIGS. 7 and 8, respectively) of the plurality of flight paths through the adverse weather condition. At 906, selecting a given flight path from the at least two flight paths through the adverse weather condition that poses a least amount of structural risk to the aerial vehicle from the adverse weather condition. At 908, generating flight control data (e.g., the flight control data 114, as illustrated in FIG. 1) in response to selecting the given flight path. The flight control data can characterize flight control commands for the aerial vehicle for maneuvering the aerial vehicle according to the given flight path through the adverse weather condition.

In some examples, the flight control data can be employed to cause the aerial vehicle to maneuver according to the given flight path through the adverse weather condition. In additional examples, the method 900 can include generating or providing MLM tuning data (e.g., the MLM tuning data 116, as illustrated in FIG. 1) indicative of whether the given flight path is one a safe flight route or an unsafe flight route. In further examples, the method 900 can include updating (e.g., tuning) the MLM model, such that the given flight path is one emphasized in response to determining that the given flight path is the safe flight route or deemphasized in response to determining that the given flight path is the unsafe flight route, for a subsequent adverse weather condition.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
a machine learning maneuver (MLM) model executing on a processor on an aerial vehicle, the MLM model being programmed to generate maneuver data identifying a plurality of flight paths for maneuvering an aerial vehicle through an adverse weather condition and a flight path confidence score for each flight path of the plurality of flight paths based on at least weather sensor data characterizing the adverse weather condition, wherein the flight path confidence score for each flight path of the plurality of flight paths is indicative of a probability of successfully maneuvering the aerial vehicle through the adverse weather condition according to a respective flight path; and
a maneuver decision engine executing on the processor on the aerial vehicle, the maneuver decision engine being programmed to:
evaluate each flight path confidence score for each flight path relative to a flight path confidence threshold to identify a given flight path of the plurality of flight paths through the adverse weather condition that poses a least amount of structural risk to the aerial vehicle;
select a flight path having a corresponding flight path confidence score that exceeds the flight path confidence threshold;
generate flight control data characterizing flight commands for the aerial vehicle based on the selected flight path to maneuver through the adverse weather condition, wherein the flight control data causes the aerial vehicle to maneuver through the adverse weather condition; and
generate MLM tuning data indicative of whether the selected flight path is one a safe flight route or an unsafe flight route in response to maneuvering the aerial vehicle according to the selected flight path through the adverse weather condition.

2. The system of claim 1, wherein the MLM model is further programmed to generate the maneuver data based on other sensor data generated by one or more sensors of the aerial vehicle, and the one or more sensors comprises at least one camera and the other sensor data comprises one or more camera images of the adverse weather condition.

3. The system of claim 2, wherein the MLM model is further programmed to generate the maneuver data based on flight mission data characterizing a level of importance of a mission being implemented by the aerial vehicle.

4. The system of claim 3, wherein the maneuver decision engine is further programmed to:
evaluate each flight path confidence score for each flight path relative to the flight path confidence threshold to identify at least two flight paths of the plurality of flight paths through the adverse weather condition that is greater than the flight path confidence threshold;
evaluate the flight mission data indicative of the level of importance of the mission being implemented by the aerial vehicle relative to a mission importance threshold; and
select a respective flight path from the at least two flight paths of the plurality of flight paths through the adverse weather condition based on the evaluation of the flight mission data relative to the mission importance threshold.

5. The system of claim 4, wherein the maneuver decision engine is programmed to select the respective flight path from the at least two flight paths based on the evaluation indicating that the level importance of the mission is greater than the mission importance threshold, wherein the respective flight path corresponds to the given flight path.

6. The system of claim 5, wherein the maneuver decision engine is further programmed to generate flight control data in response to identifying the given flight path, the flight control data characterizing flight control commands for the aerial vehicle for maneuvering the aerial vehicle according to the given flight path through the adverse weather condition.

7. The system of claim 6, wherein the MLM model is generated by an MLM algorithm based on learned weather maneuver data to generate the MLM model, the learned weather maneuver data characterizing a plurality of past weather conditions and associated maneuvers implemented by one or more aerial vehicles with respect to corresponding past weather conditions of the plurality of past weather conditions.

8. The system of claim 7, wherein the given flight path corresponds to the safe flight route in response to determining that a structural state of the aerial vehicle after being maneuvered through the adverse weather condition is less than a structural integrity threshold, and the given flight path corresponds to the safe flight route in response to determining that the structural state of the aerial vehicle after being maneuvered through the adverse weather condition is greater than the structural integrity threshold.

9. The system of claim 7, wherein the maneuver decision engine is further programmed to cause the MLM model to be updated based on the MLM tuning data, such that the given flight path is one emphasized in response to determining that the given flight path is the safe flight route or deemphasized in response to determining that the given flight path is the unsafe flight route, for a subsequent adverse weather condition.

10. The system of claim 9, wherein the MLM model is further programmed to generate updated maneuver data based on updated weather sensor data characterizing the subsequent adverse weather condition, the updated maneuver data identifying a plurality of new flight paths through the subsequent adverse weather condition and a corresponding path confidence score for each new flight path, wherein one of the plurality of new flight paths corresponds to the given flight path and has a respective flight path confidence score that is greater than the flight path confidence score for the given flight path through the adverse weather condition.

11. The system of claim 7, wherein the maneuver decision engine is further programmed to evaluate structural data generated by one or more structural sensors characterizing a structural integrity of the aerial vehicle relative to a structural integrity threshold in response to maneuvering the aerial vehicle through the adverse weather condition to determine whether the given flight path through the adverse weather condition is to be identified as one of the safe flight route or the unsafe flight route, wherein the given flight path is identified as the safe flight route in response to the structural data being less than the structural integrity threshold and the given flight path is identified as the unsafe flight route in response to the structural data being greater than the structural integrity threshold.

12. A method comprising:
providing at least weather sensor data characterizing an adverse weather condition to a machine learning maneuver (MLM) model executing on a processor on an aerial vehicle to generate maneuver data identifying a plurality of flight paths for maneuvering the aerial vehicle through an adverse weather condition and a flight path confidence score for each flight path of the plurality of flight paths, wherein the flight path confidence score for each flight path of the plurality of flight paths is indicative of a probability of successfully maneuvering the aerial vehicle through the adverse weather condition according to a respective flight path;

evaluating each flight path confidence score for each flight path relative to a flight path confidence threshold to identify at least two flight paths of the plurality of flight paths through the adverse weather condition that exceed the flight path confidence threshold;

selecting a given flight path from the at least two flight paths through the adverse weather condition that poses a least amount of structural risk to the aerial vehicle;

generating flight control data in response to selecting the given flight path, the flight control data characterizing flight control commands for the aerial vehicle for maneuvering the aerial vehicle along the given flight path through the adverse weather condition, wherein the flight control data causes the causes the aerial vehicle to maneuver through the adverse weather condition; and generating MLM tuning data indicative of whether the given flight path is one a safe flight route or an unsafe flight route in response to maneuvering the aerial vehicle according to the given flight path through adverse weather condition.

13. The method of claim 12, further comprising updating the MLM model based on the MLM tuning data, such that the given flight path is one emphasized in response to determining that the given flight path is the safe flight route or deemphasized in response to determining that the given flight path is the unsafe flight route, for a subsequent adverse weather condition.

14. The method of claim 13, further comprising generating updated maneuver data based on updated weather sensor data characterizing the subsequent adverse weather condition, the updated maneuver data identifying a plurality of new flight paths through the subsequent adverse weather condition, and a corresponding path confidence score for each new flight path, wherein one of the plurality of new flight paths corresponds to the given flight path and has a respective flight path confidence score that is greater than the flight path confidence score for the given flight path through the adverse weather condition.

15. The method of claim 14, further comprising configuring the aerial vehicle with maneuver control data characterizing a plurality of flight rules to control a movement of the aerial vehicle during a flight, wherein at least one rule of the plurality of flight rules restricts maneuvering the aerial vehicle through the adverse weather condition, and the at least one rule is overridden to maneuver the aerial vehicle through the adverse weather condition in response to the selecting the given flight path.

16. The method of claim 14, further comprising:
receiving structural data generated by one or more structural sensors characterizing a structural integrity of the aerial vehicle in response to the maneuvering of the aerial vehicle according to the given flight path through the adverse weather condition; and evaluating the structural data relative to a structural integrity threshold to determine whether the given flight path through the adverse weather condition is to be identified as one of the safe flight route or the unsafe flight route, wherein the given flight path is identified as the safe flight route in response to the structural data being less than the structural integrity threshold and the given flight path is identified as the unsafe flight route in response to the structural data being greater than the structural integrity threshold.

17. A system comprising:
memory to store machine readable instructions and data, the data comprising weather sensor data generated by one or more weather sensors on-board of an aerial vehicle characterizing an adverse weather condition, and flight mission data characterizing a level of importance of a mission being implemented by the aerial vehicle; and one or more processors to access the memory and execute the machine readable instructions, the machine readable instructions comprising:
a machine learning maneuver (MLM) model programmed to:
generate maneuver data identifying a plurality of flight paths for maneuvering the aerial vehicle through the adverse weather condition and a flight path confidence score for each flight path of the plurality of flight paths based on the weather sensor data and the flight mission data; and a maneuver decision engine programmed to:
evaluate each flight path confidence score for each flight path relative to a flight path confidence threshold to identify a given flight path of the plurality of flight paths through the adverse weather condition that poses a least amount of structural risk to the aerial vehicle;

generate flight control data in response to identifying the given flight path, the flight control data characterizing flight control commands for the aerial vehicle for maneuvering the aerial vehicle according to the given flight path through the adverse weather condition, wherein the flight control data causes the aerial vehicle to maneuver through the adverse weather condition;

generate MLM tuning data indicative of whether the given flight path is one a safe flight route or an unsafe flight route in response to maneuvering the aerial vehicle according to the given flight path through adverse weather condition; and update the MLM model based on the MLM tuning data, such that the given flight path is one emphasized in response to determining that the given flight path is the safe flight route or deemphasized in response to determining that the given flight path is the unsafe flight route, for a subsequent adverse weather condition.

18. The system of claim 17, wherein the maneuver decision engine is further programmed to:
evaluate each flight path confidence score for each flight path relative to the flight path confidence threshold to identify at least two flight paths of the plurality of flight paths through the adverse weather condition that is greater than the flight path confidence threshold;

evaluate the flight mission data relative to a mission importance threshold; and select a respective flight path from the at least two flight paths through the adverse weather condition based on the evaluation of the flight mission data relative to the mission importance threshold, the respective flight path corresponding to the given flight path.

* * * * *